(12) United States Patent
Herbert

(10) Patent No.: US 8,616,249 B2
(45) Date of Patent: Dec. 31, 2013

(54) BLENDER WITH FEATURE FOR DISPENSING PRODUCT BY WEIGHT

(75) Inventor: Michael Herbert, Winchester, MA (US)

(73) Assignee: Island Oasis Frozen Cocktail Co., Inc., Walpole, MA (US)

( * ) Notice: Subject to any disclaimer, the term of this patent is extended or adjusted under 35 U.S.C. 154(b) by 505 days.

(21) Appl. No.: 12/959,048

(22) Filed: Dec. 2, 2010

(65) Prior Publication Data

US 2011/0186172 A1 Aug. 4, 2011

Related U.S. Application Data

(60) Provisional application No. 61/300,259, filed on Feb. 1, 2010.

(51) Int. Cl.
*B65B 1/30* (2006.01)
*B65B 3/26* (2006.01)
*B65B 1/04* (2006.01)

(52) U.S. Cl.
USPC .................. 141/83; 141/95; 141/103; 222/77

(58) Field of Classification Search
USPC ............... 141/83, 94, 95, 100, 103; 426/231; 222/77
See application file for complete search history.

(56) References Cited

U.S. PATENT DOCUMENTS

| | | | |
|---|---|---|---|
| 3,336,957 A * | 8/1967 | Goosman | 141/141 |
| 3,461,934 A * | 8/1969 | Waters | 241/82.1 |
| 4,681,030 A * | 7/1987 | Herbert | 99/484 |
| 5,332,374 A | 7/1994 | Kricker et al. | |
| 5,799,567 A * | 9/1998 | Dorner | 99/348 |
| 6,194,013 B1 * | 2/2001 | Kolar et al. | 426/231 |
| 6,342,260 B2 | 1/2002 | Kolar et al. | |
| 6,793,167 B2 | 9/2004 | Karkos, Jr. et al. | |
| 6,911,756 B1 | 6/2005 | Chang | |
| 7,766,185 B2 * | 8/2010 | Herbert | 220/719 |
| 2002/0196705 A1 | 12/2002 | Jersey et al. | |
| 2005/0127098 A1 * | 6/2005 | Bertone | 222/129.1 |
| 2006/0238346 A1 * | 10/2006 | Teller | 340/572.1 |
| 2007/0158353 A1 * | 7/2007 | Herbert | 220/719 |
| 2007/0267087 A1 | 11/2007 | Jones et al. | |
| 2008/0154389 A1 | 6/2008 | Smith et al. | |
| 2008/0230558 A1 * | 9/2008 | Koerner et al. | 222/54 |
| 2011/0073212 A1 | 3/2011 | Erbs et al. | |

FOREIGN PATENT DOCUMENTS

DE 41 36 923 A1 5/1993
EP 1 929 918 A2 6/2008

* cited by examiner

*Primary Examiner* — Timothy L Maust
*Assistant Examiner* — Brandon J Warner
(74) *Attorney, Agent, or Firm* — Lando & Anastasi, LLP

(57) ABSTRACT

Disclosed herein is an apparatus for preparing frozen drinks. In one example, the apparatus includes a platform configured to support a blender cup. The platform is reversibly translatable between a first position beneath an ice shaver and a second position beneath a flavoring dispenser. A weight sensor is mechanically coupled to the platform. The weight sensor is configured to produce an output signal indicative of a weight of an object present on the platform. The apparatus further includes a safety circuit configured receive a sensor input and to facilitate safe operation of the apparatus responsive to the sensor input being indicative of a safe condition of the apparatus.

24 Claims, 20 Drawing Sheets

US 8,616,249 B2

BLENDER WITH FEATURE FOR DISPENSING PRODUCT BY WEIGHT

RELATED APPLICATIONS

This application claims priority under 35 U.S.C. §119(e) to U.S. Provisional Application Ser. No. 61/300,259, entitled "BLENDER WITH FEATURE FOR DISPENSING PRODUCT BY WEIGHT," filed on Feb. 1, 2010, which is herein incorporated by reference in its entirety.

BACKGROUND OF INVENTION

1. Field of Invention

Aspects and embodiments of the present invention are directed to systems and methods for the preparation of blended drinks including ice and one or more flavorings.

2. Discussion of Related Art

A popular form of drink served in venues such as restaurants or bars, and often containing alcohol, is referred to as a "frozen" drink. Frozen drinks often have a slush-like consistency and are generally prepared from a blended mixture of ice and one or more flavorings, such as juices, flavored syrups, or pieces of fruit. Examples of popular frozen drinks include margaritas, daiquiris, and piña coladas.

To prepare frozen drinks of a consistent quality, it is often desirable to provide a consistent ratio of flavoring to ice in a series of frozen drinks of a particular type. Machines have been developed which are capable of dispensing a determined amount of ice into a blender cup for subsequent mixing or blending with other ingredients. One machine of this type is disclosed in U.S. Pat. Nos. 6,194,013 and 6,342,260. The machine disclosed in the identified prior patents employs a weighing mechanism so that a determined weight of ice can be automatically dispensed or a determined ratio of ice to flavoring by weight can be achieved.

SUMMARY OF INVENTION

Aspects and embodiments of the present invention are directed to systems and methods for the preparation of blended drinks including ice and one or more flavorings. In accordance with some aspects and embodiments, there are provided systems and methods for an automated preparation of blended drinks wherein the ingredients used to make the drinks are dispensed by weight. In accordance with some aspects and embodiments, one or more ingredients are introduced into a blender cup while the blender cup is in a first position and one or more other ingredients are introduced into the blender cup when the blender cup is in a second position.

In accordance with an embodiment of the present invention, there is provided an apparatus for preparing frozen drinks. The apparatus comprises a platform configured to support a blender cup, the platform reversibly translatable between a first position beneath an ice shaver and a second position beneath a flavoring dispenser, a weight sensor mechanically coupled to the platform and configured to produce an output signal indicative of a weight of an object present on the platform, and a safety circuit configured receive a sensor input and to facilitate safe operation of the apparatus responsive to the sensor input being indicative of a safe condition of the apparatus.

In accordance with some aspects, the sensor input comprises a signal from the weight sensor. The signal from the weight sensor may be indicative of a weight within a desired range, the desired range corresponding with a point in a preparation of a frozen drink on the apparatus. The safety circuit may be configured to disable activation of the blender absent a receipt of a signal from the weight sensor indicative of a weight within a desired range expected at a point in the preparation of the frozen drink immediately prior to the activation of the blender. The desired range may be calculated at least in part from an expected weight of an amount of ingredients expected to be present in the blender cup prior to the activation of the blender.

In accordance with some aspects, the safety circuit is configured to disable movement of the platform absent a receipt of a signal from the weight sensor indicative of a weight within a range desired immediately prior to a point in the preparation of the frozen drink wherein movement of the platform is to be performed.

In accordance with some aspects, the desired range may include a weight consistent with that of an empty blender cup and lid prior to a point in the preparation of the frozen drink wherein drink ingredients are added to the blender cup.

In accordance with some aspects, the desired range includes a weight consistent with that of the blender cup filled with a desired quantity of one of ice and flavoring at point in the preparation of the frozen drink subsequent to the addition of one or more drink ingredients to the blender cup.

In accordance with some aspects, the safety circuit is configured to disable the ice shaver absent a receipt of a signal from the weight sensor indicative of a weight within a desired range expected at a point in the preparation of the frozen drink immediately prior to the activation of the ice shaver. The desired range may include a weight consistent with that of an empty blender cup and lid and/or a weight consistent with that of the blender cup filled with a desired quantity of flavoring.

In accordance with some aspects, the safety circuit is configured to disable the flavoring dispenser absent a receipt of a signal from the weight sensor indicative of a weight within a desired range expected at a point in the preparation of the frozen drink immediately prior to the dispensing of flavoring into the blender cup. The desired range may include a weight consistent with that of an empty blender cup and lid and/or a weight consistent with that of the blender cup filled with a desired quantity of ice.

In accordance with some aspects, the safety circuit is configured to disable a blending function of the apparatus when a lid of the blender cup is in an open position. The apparatus may further comprise a mechanism configured to maintain the lid in an open position, the mechanism operable only when the apparatus is set to operate in a manual loading mode. The safety circuit may be configured to disable the activation of the manual loading mode absent a receipt of a signal from the weight sensor indicative of a weight within a desired range. The desired range may include a weight consistent with an expected weight of the blender cup and lid while the lid of the blender cup is being held in an open position at a point in the preparation of the frozen drink at which manual addition of ingredients to the blender cup is to be performed. The desired range may include a weight consistent with that the blender cup and lid while the lid of the blender cup is being held in an open position and/or a weight consistent with that the blender cup and lid while the lid of the blender cup is being held in an open position and the blender cup is filled with a desired quantity of at least one of ice and flavoring.

In accordance with some aspects, the safety circuit is configured to disable movement of the platform when a lid of the blender cup is in an open position.

In accordance with some aspects, the apparatus further comprises a force monitor configured to detect a resistance to movement of the platform in electrical communication with the safety circuit. The safety circuit may be configured to halt movement of the platform responsive to a receipt of a signal from the force monitor indicative of a resistance to movement of the platform outside of a desired range.

In accordance with some aspects, the safety circuit is configured to halt movement of the platform responsive to a receipt of a signal from the weight sensor indicative of a resistance to movement of the platform outside of a desired range.

In accordance with some aspects, the safety circuit is configured to compare a measured amount of time to dispense a desired weight of ice from the ice shaver to a defined time, and responsive to the measured amount of time differing from the defined time by more than a defined amount, disabling operation of the ice shaver.

In accordance with some aspects, the safety circuit is configured to compare a measured amount of time to dispense a desired weight of flavoring from the flavoring dispenser to a defined time, and responsive to the measured amount of time differing from the defined time by more than a defined amount, disabling operation of the flavor dispenser.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
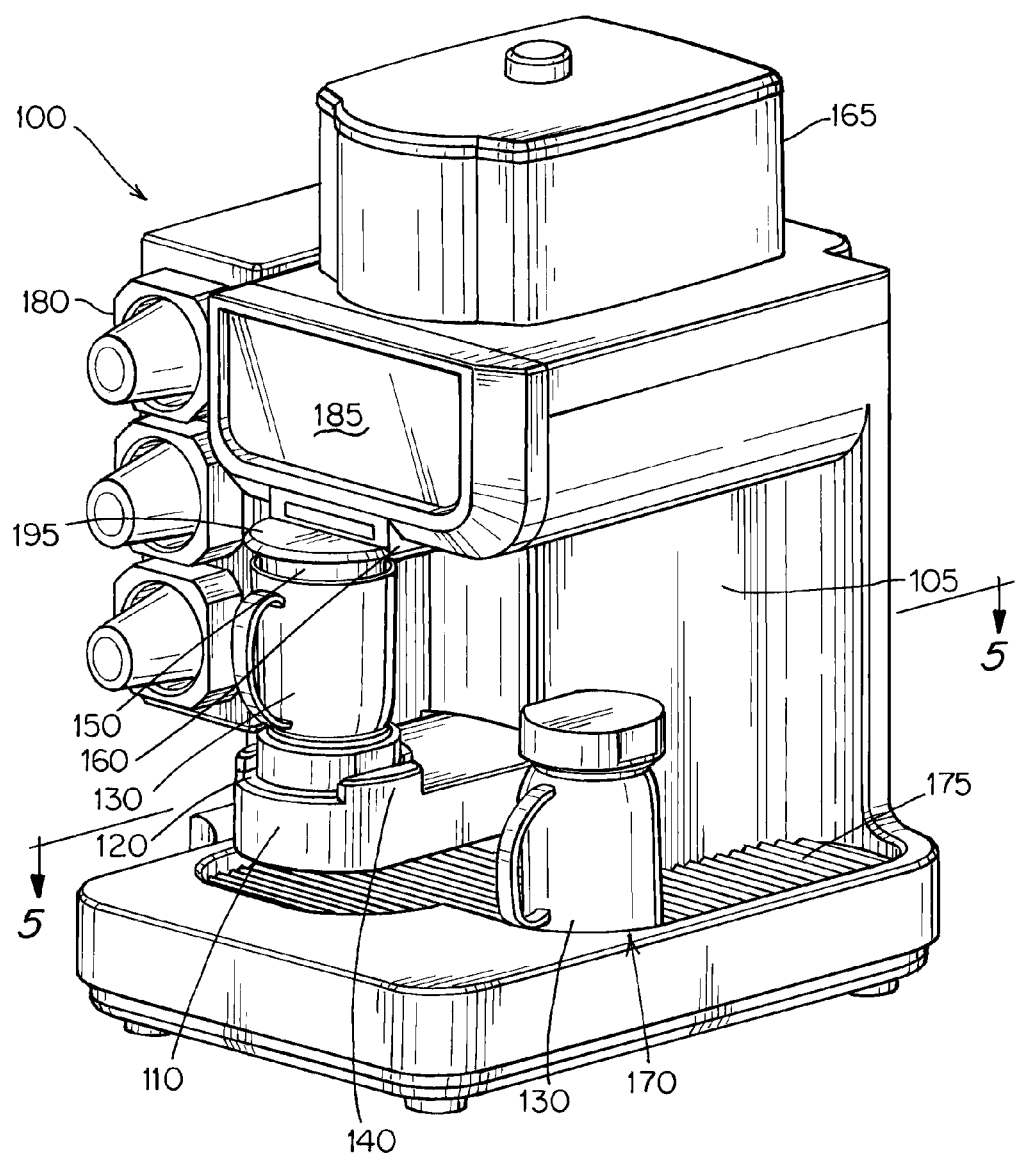
FIG. 1 is a perspective view of a blender in accordance with an embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Some embodiments of the present invention include an apparatus for dispensing one or more flavoring products including, for example, juices, pieces of fruit, milk, cream, or flavored syrups (hereinafter referred to as "flavoring product," "flavoring," or "product") into a blender cup placed on and supported by a platform while the platform is located in a first position. The platform supporting the blender cup is constructed and arranged to move into a second position at which shaved ice (hereinafter referred to as simply "ice") and/or one or more additional products are dispensed into the blender cup. A blender motor is included in the platform such that the blender may be activated to mix the ingredients in the blender cup when the platform is in the first and/or second position, or in some embodiments, while in a third position. A weight sensor is coupled to the platform and configured to weigh the amount of product and/or the amount of ice dispensed into the blender cup such that a frozen drink with a defined quantity of various ingredients may be prepared by the apparatus.

Dispensing of flavoring product into a blender cup in a position different from a position where ice is dispensed into the blender cup provides for numerous advantages. For example, if in the position where the ice is dispensed there is no need to include flavoring product dispensers, a larger ice chute may be provided than if the ice chute had to share a position with flavoring product dispensers. Embodiments having larger ice chutes may exhibit a greater rate of ice dispensation, lowering a cycle time for the preparation of a frozen drink, as compared to conventional systems with smaller ice chutes. Further, in embodiments where flavoring product dispensers are located in a different position than an ice dispenser, a greater number and variety of flavoring dispensers may be provided. This allows for such a system to be capable of preparing a greater variety of frozen drinks as compared to a system where the number and/or type of flavoring dispensers are limited due to concerns with blocking the dispensing of ice from an ice dispenser.

Further, in embodiments wherein a blender cup is placed on a moveable platform for the preparation of frozen drinks, the platform may be moved into a position where the top of the blender cup is at least partially unobstructed by flavoring dispensers or an ice dispenser. This may provide for a greater ease of manually introducing products such as solid fruit or additional liquid product into the blender cup as compared to conventional systems wherein the blender cup is placed in a blender in single position below an ice dispenser and/or flavoring product dispenser(s).

Some embodiments of the present invention include a weight sensor coupled to the platform on which the blender cup is supported. The weight sensor is used to monitor the changing weight of the blender cup as product and/or ice is added to the blender cup. This provides for a method of dispensing a known quantity of flavoring product and/or ice by weight. Dispensing flavoring product and/or ice by weight may provide for a more accurate dispensed amount of ingredients than in systems wherein the flavoring product and/or ice is dispensed for a defined time.

A blender apparatus, generally indicated at 100, according to a first embodiment of the present invention is illustrated in FIG. 1. The blender 100 includes a moveable platform 110, which includes an area 120 for supporting a blender cup 130. The area 120 is defined by a plurality of protrusions 140, which in use serve to hold the blender cup 130 in position on the platform 110. The platform 110 is moveable along an axis perpendicular to a plane defined by the face of the blender 100. The platform is moveable into and out of the body 105 of the blender 100 between a first position beneath a first product dispenser 150 and a second position beneath a second product dispenser 160. The first product dispenser 150 includes a plurality of flavoring product dispensers. The second product dispenser 160 includes an ice chute which is configured to deliver ice from an ice bin 165 mounted to the top of the blender 100. The ice from the ice bin 165 is shaved by shaving blades (not illustrated) present in the body of the blender as it is dispensed into the blender cup 130. The blender 100 also includes an optional blender cup rinse station 170, an optional blender cup drying station 175, and an optional drink cup dispenser 180. A touch sensitive control and display panel 185 is utilized by an operator to operate the blender 100.

The blender cup 130 includes a set of blades used to mix product in the blender cup. These blades are driven by a magnetically coupled blender drive located in the platform 110. The magnetically coupled blender drive is of the type described in U.S. Pat. No. 6,793,167, which is incorporated herein by reference in its entirety. This drive uses a blender motor located in platform 110 or any other convenient location, which drives a magnetic coupling to drive a drive plate in the base of the blender cup to rotate the blender blades without a mechanical connection or linkage between the blender motor and the blender cup. In other embodiments, the blender motor is of a conventional type, including a rotatable shaft which physically couples to a rotatable member on the bottom of the blender cup when the blender cup is lowered into position onto the platform. The rotatable member is coupled to the blades of the blender such that the blender motor is physically coupled to and may rotate the blades.

Figure 2:
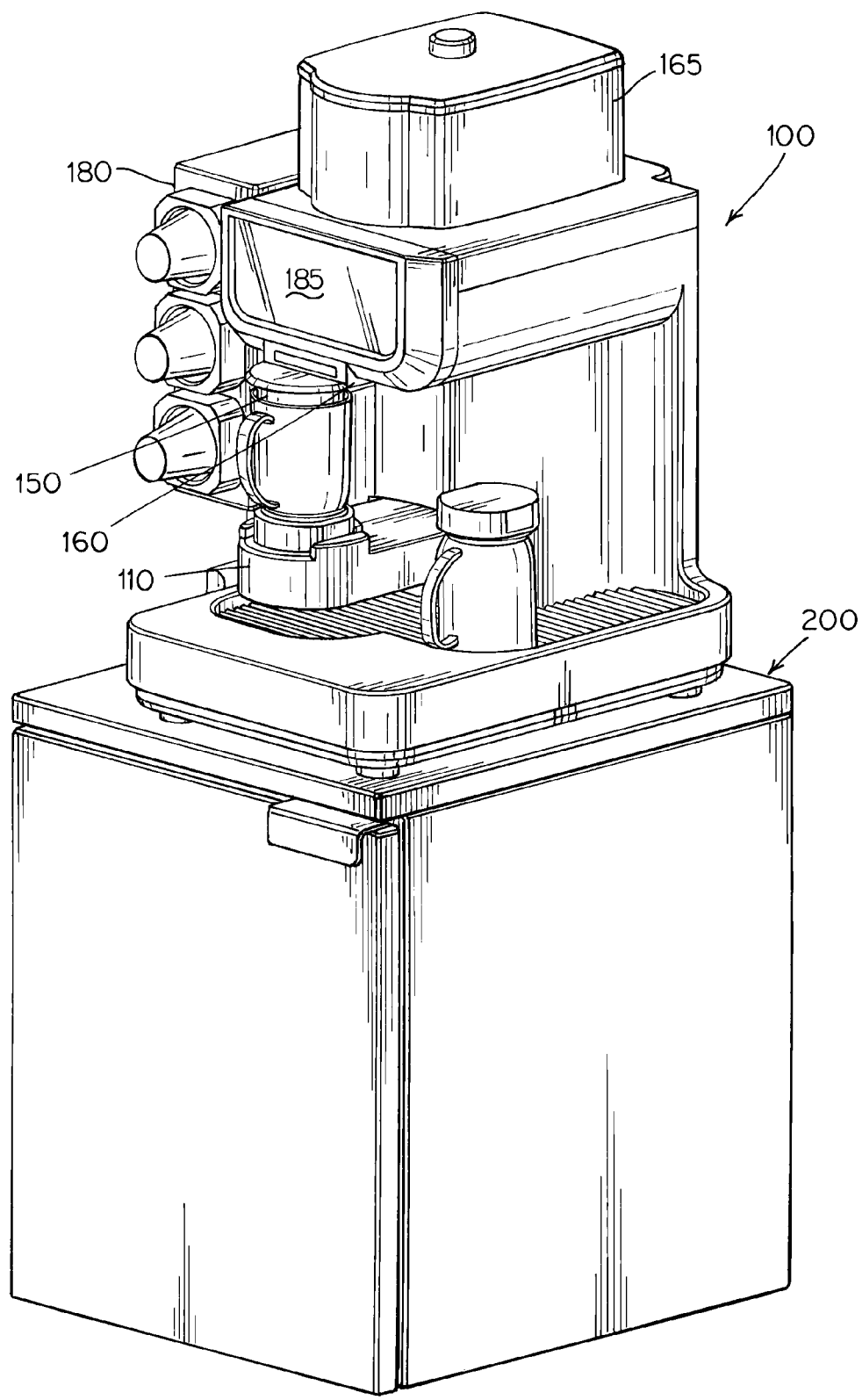
FIG. 2 is a perspective view of a blender in accordance with another embodiment of the present invention.

FIG. 2 illustrates a blender in accordance with another embodiment of the present invention. In this embodiment, a blender similar to that of FIG. 1 is mounted atop a cabinet 200. The cabinet 200 includes a refrigerated compartment in which flavoring product is located. In use flavoring product in the cabinet 200 is pumped to the blender 100 when needed for the preparation of a frozen drink.

Figure 3:
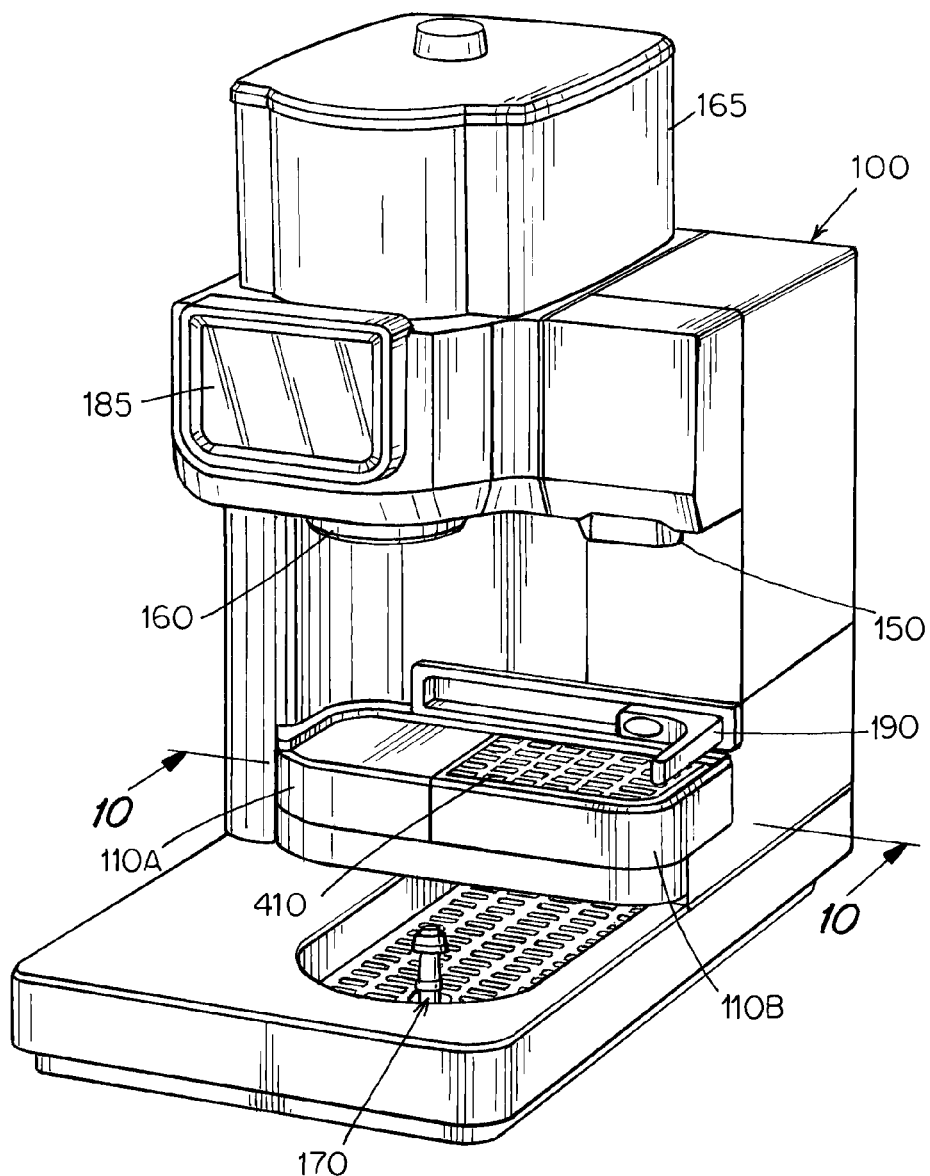
FIG. 3 is a perspective view of a blender in accordance with another embodiment of the present invention.

FIG. 3 illustrates a blender in accordance with another embodiment of the present invention. In this embodiment, the platform 110 is designed to remain stationary while the blender cup 130 is moved across the platform to positions beneath flavoring and/or ice dispenser(s) by a moveable arm 190. In the embodiment of the blender illustrated in FIG. 4, the blender is mounted atop a cabinet 200, similar to the cabinet 200 illustrated in FIG. 2.

Figure 4:
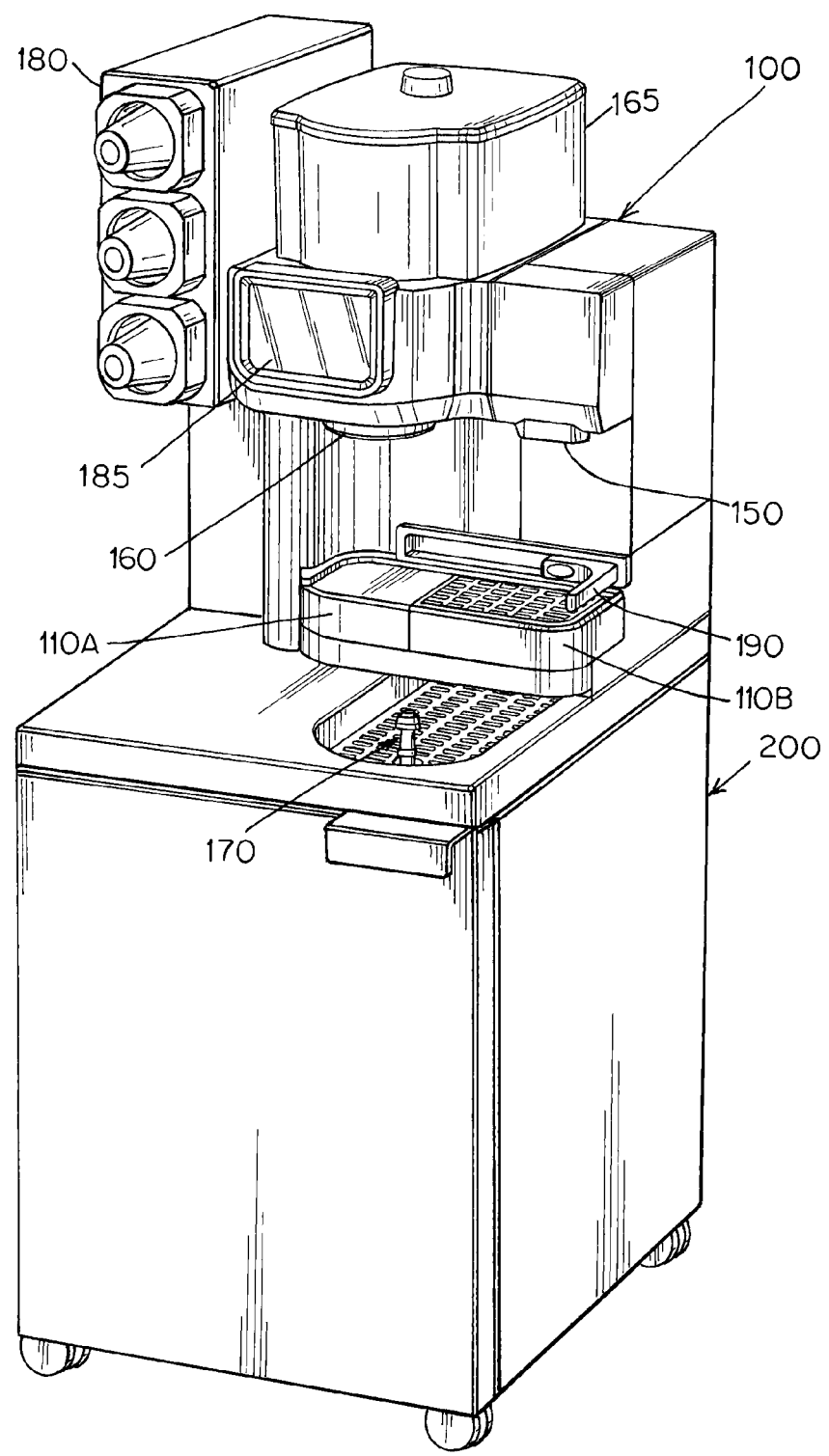
FIG. 4 is a perspective view of a blender in accordance with another embodiment of the present invention.

In some embodiments, perforations may be provided in the platform (illustrated in FIGS. 3 and 4) and/or beneath the platform (illustrated in FIGS. 1-4) to provide for directing any spilled fluids to a drain (not illustrated). In some embodiments, as illustrated in FIGS. 3 and 4, the perforations may be present on only a portion of the platform, and in other embodiments, the perforations may be present across substantially all of an upper surface of the platform 110.

A weight sensor is coupled to the platform 110. The weight sensor in some embodiments comprises a load cell. This load cell may comprise any one or more of a semiconductor strain gauge, a capacitive strain gauge, a foil strain gauge, a piezoelectric strain gauge, or any other form of strain gauge known in the art.

Figure 5:
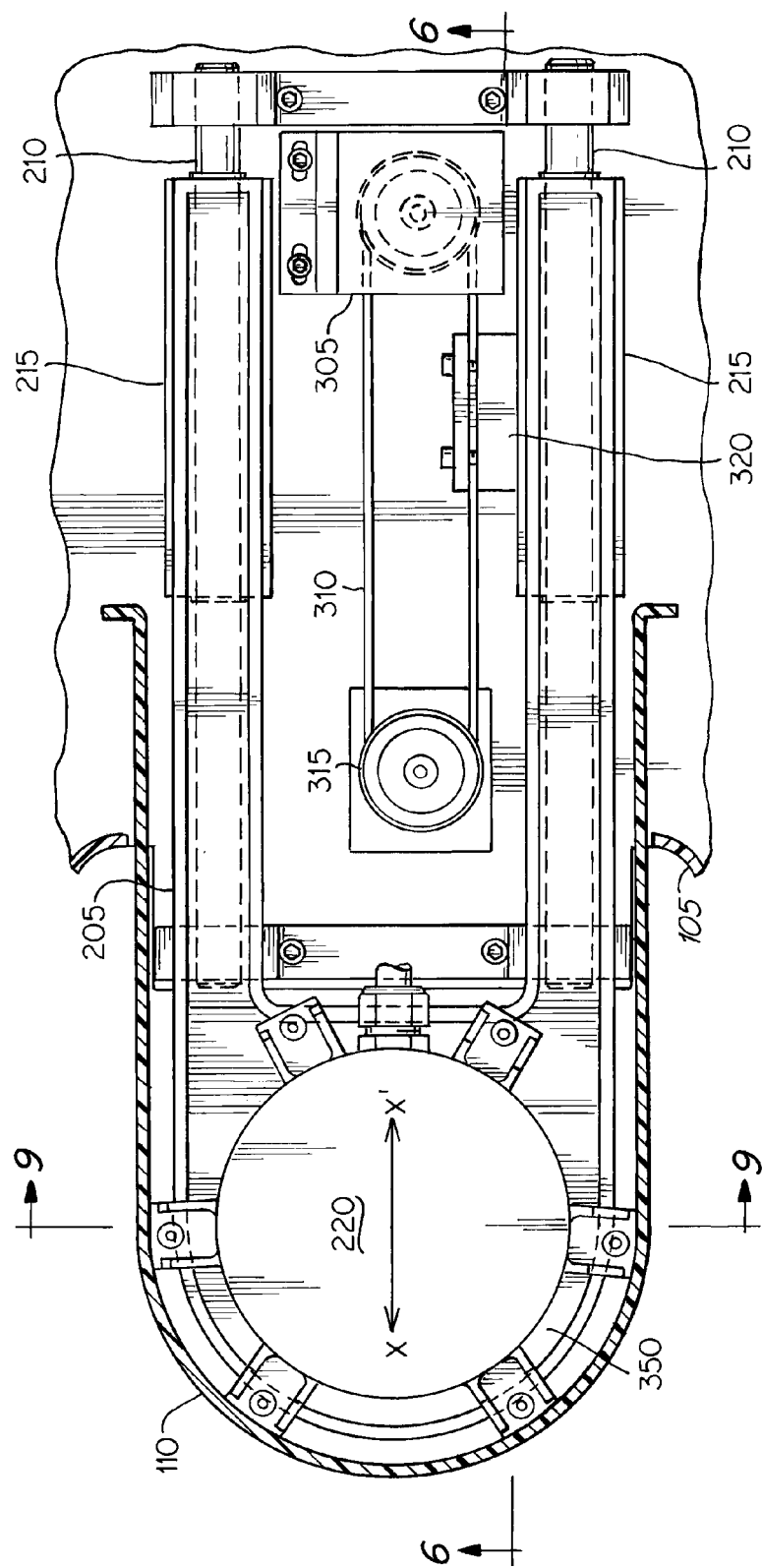
FIG. 5 is a cross sectional plan view of the platform of the blender of FIG. 1 taken along line 5-5 of FIG. 1.

An embodiment of the internal portions of the platform 110 is illustrated in FIGS. 5-9. FIG. 5 is a cross sectional plan view of the platform 110 taken along line 5-5 of FIG. 1. The platform includes a pair of support structures 205 which slide back and forth in direction x-x' along guide rails 210 and support the platform 110. The support structures 205 include bearing blocks 215 through which the guide rails pass. The platform is moved back and forth along the guide rails 210 through the use of an electric motor 305 which drives a belt 310 about a pulley 315. In some embodiments, the electric motor 305 may be a brushless DC motor or a DC stepper motor. Attached to the belt 310 is a belt clamp 320 which connects the belt 310 to one of the bearing blocks 215. Motion of the belt 310 is transmitted to the platform 110 through the belt clamp 320. The platform 110 further includes a compartment 220 in which the blender drive motor resides.

Figure 6:
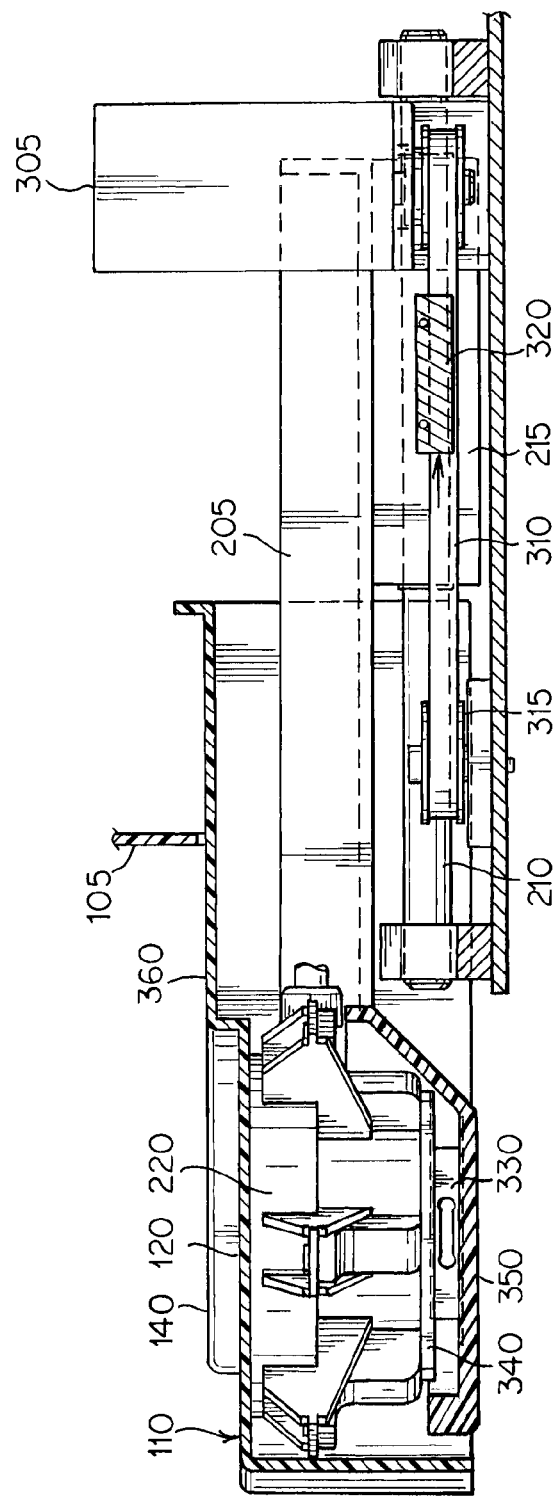
FIG. 6 is a cross sectional side view of the platform taken along the line 6-6 of FIG. 5.
Figure 7:
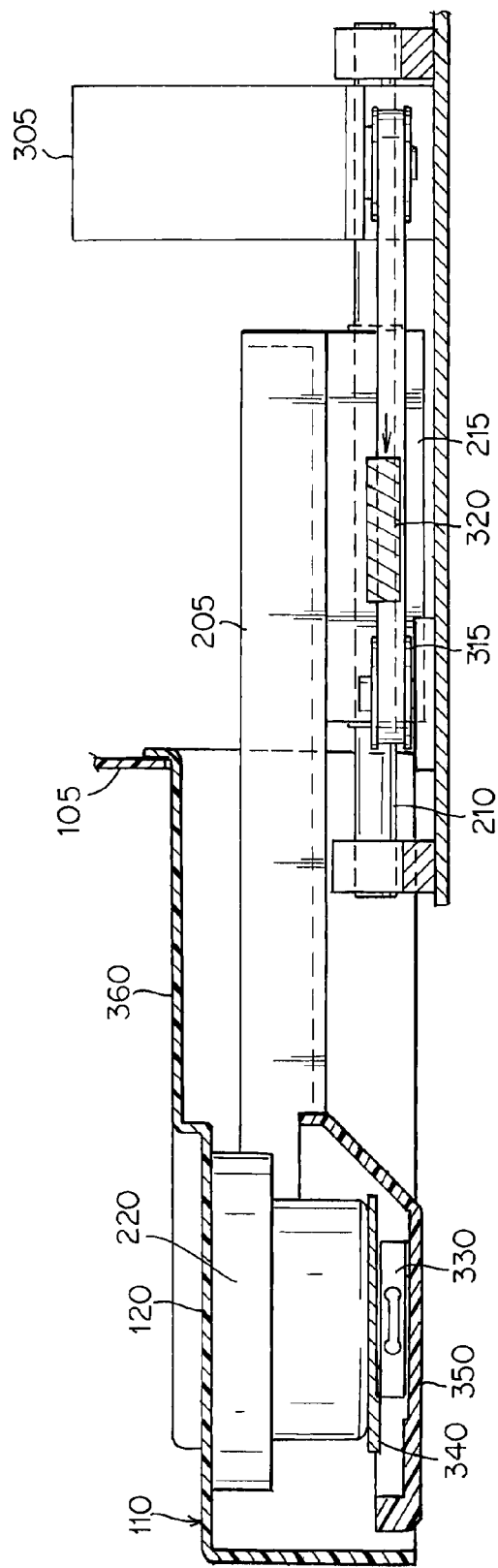
FIG. 7 is a schematic side view similar to FIG. 6, but showing the platform in an alternate extended position.

FIG. 6, a cross sectional plan view of the platform through line 6-6 of FIG. 5, illustrates the positioning of the load cell 330 beneath the blender drive. The load cell 330 is positioned beneath a blender drive support 340 and a platform base 350. The platform base 350 is mechanically coupled to the support structures 205. FIG. 6 also illustrates in greater detail the pulley system including pulley 315 which is utilized to transmit motion to the platform from the electric motor 305 through the belt 310 and the belt clamp 320. A rear upper surface 360 of the platform 110, which extends from the area 120 for supporting a blender cup 130 is also illustrated in FIG. 6. FIG. 7 is similar to FIG. 6 schematically illustrates the platform 110 in an alternate, extended position.

Figure 8:
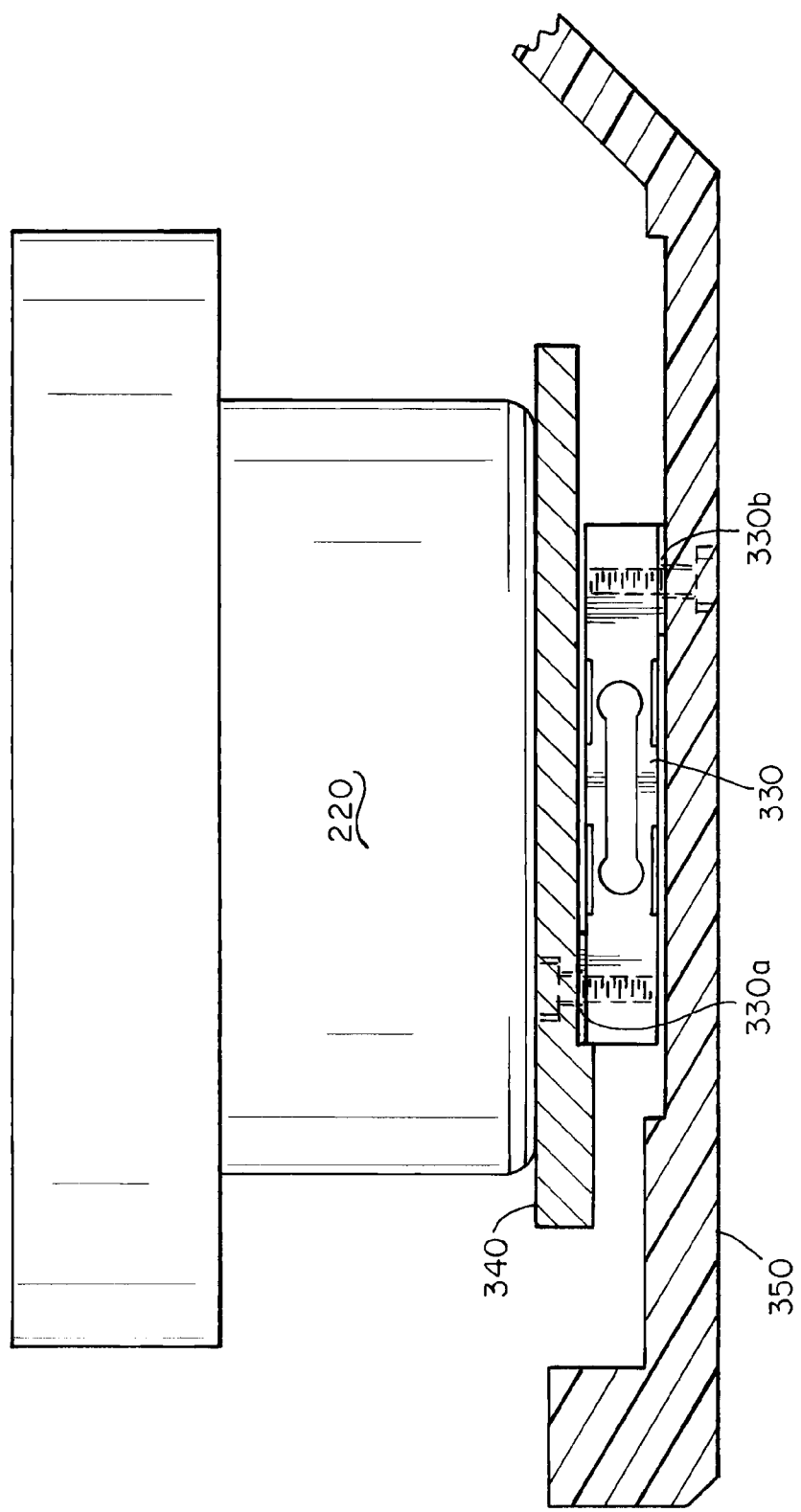
FIG. 8 is a schematic cross sectional detail view on an enlarged scale of a portion of FIG. 7 showing the configuration of the load cell.

FIG. 8 is a schematic close up detail view of the load cell 330. As is illustrated, in some embodiments, the load cell 330 may comprise a cantilever type load cell. If of a cantilever type, the load cell 330 may be mechanically coupled to a bottom surface of the blender drive support 340 at one end 330a and to an upper surface of the platform base 350 at another end 330b. The orientation of the cantilever may, for example, be fore and aft. Force generated by the weight of a blender placed on the platform is transmitted through the compartment 220 and blender drive support 340 and causes the load cell 330 to deform and generate a signal which may be read by a controller of the blender.

Figure 9:
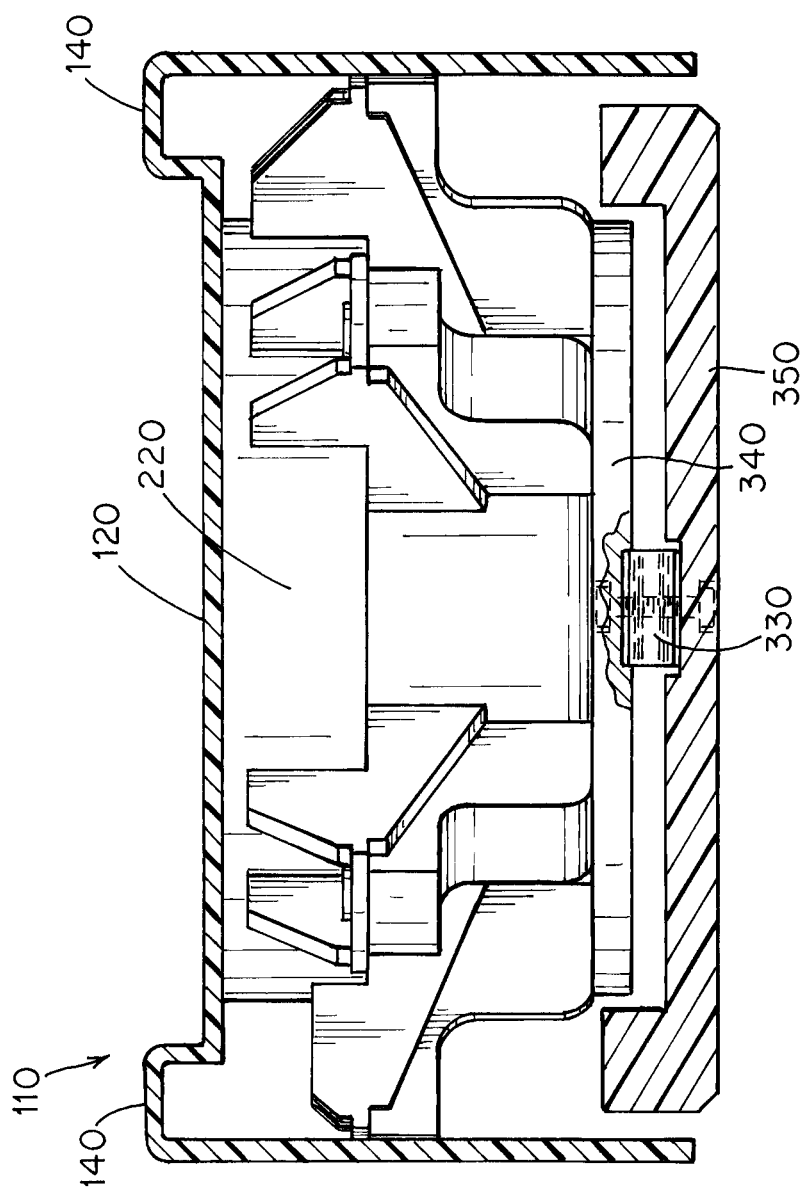
FIG. 9 is a cross sectional front view of the platform and load cell taken along line 9-9 of FIG. 5.

FIG. 9 is a cross sectional view of the platform from the front along line 9-9 of FIG. 5. As is illustrated, the load cell 330 may be positioned substantially centered beneath the blender drive compartment. Other load cell arrangements may also be used. For example, plural load cells can be distributed about the expected center of pressure to stabilize the configuration if desired for a particular design.

In other embodiments, different methods and structures for moving the platform may be utilized. For example, the platform may be moved inward and outward from the body of the blender by a hydraulic piston, a motor mounted within the platform with teeth which engage the guide rails, or by an electrically driven screw drive. Embodiments of the present invention are not limited to a particular structure or method for moving the platform unless explicitly set forth in the claims.

In an alternative embodiment, such as that illustrated in FIGS. 3 and 4, the platform extends over the entire distance and area defined by first and second locations where the blender cup may be positioned during the preparation of a drink. In these alternatives, the blender cup can be moved by an arm 190 having a shape or features corresponding to the shape or features of the blender cup so as to engage the blender cup for movement in one or more directions as desired. The arm 190 may have a single projection for moving the blender cup in a single direction as illustrated in FIGS. 3 and 4, or in alternate embodiments may have multiple projections capable of moving the blender in either direction on the platform 110 across the face of the blender. In some embodiments the arm 190 is moved by an electric motor, and in other embodiments by a pneumatic system. The embodiments of the present invention are not limited to any particular method or apparatus for moving the arm. In some embodiments, the arm 190 includes a gripping mechanism, for example, a claw, configured to securely grip the blender cup while moving it from one position to another. In some embodiments, the arm 190 may be capable of positioning the blender in more than two positions on the platform along the front face of the blender. This may be useful in some embodiments where multiple flavor dispensers and/or ice dispensers are located in different positions.

Figure 10:
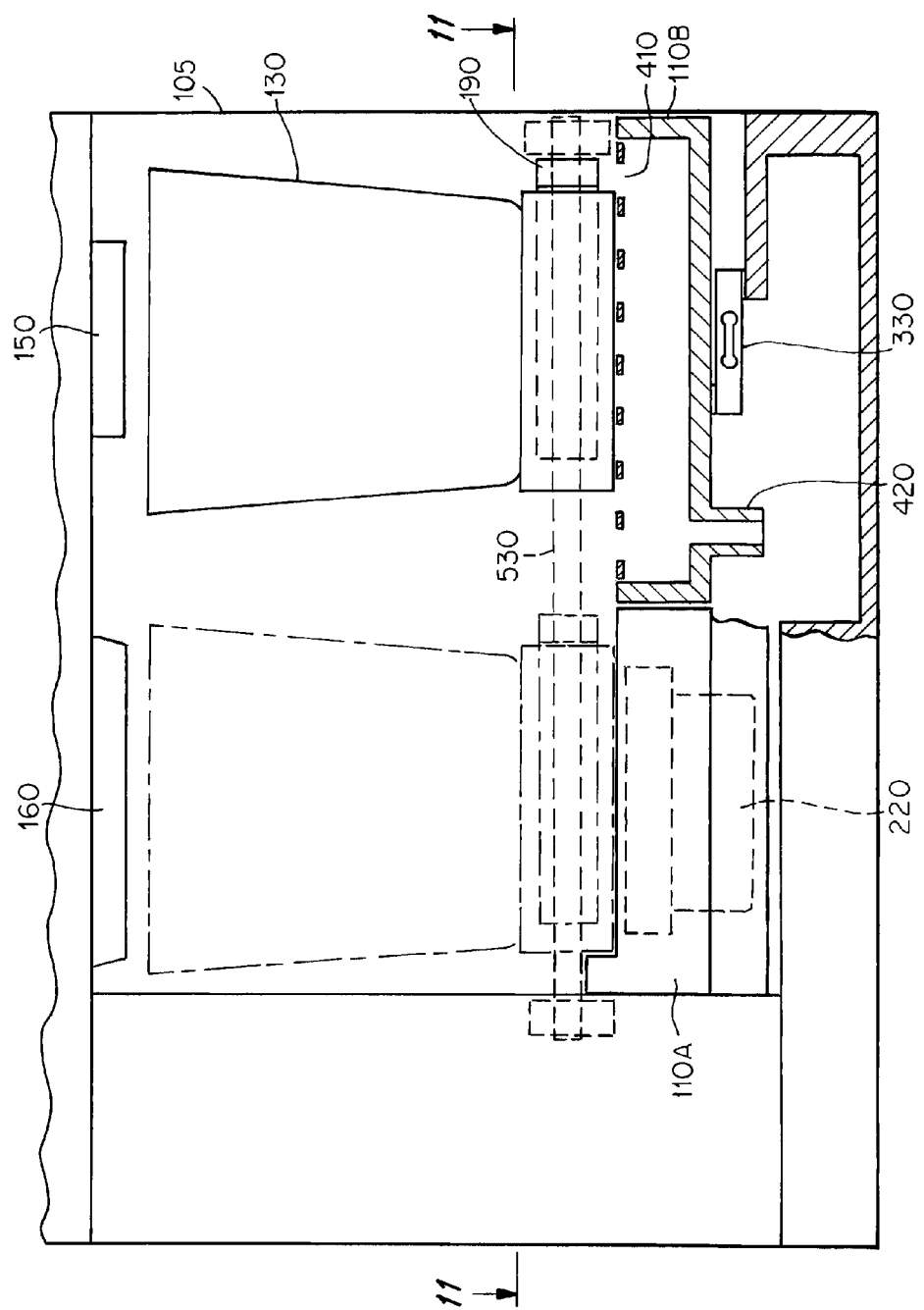
FIG. 10 is a schematic cross sectional front view of the platform of the blender of FIG. 3 taken along the line 10-10 of FIG. 3.

A platform as illustrated in the blender of FIG. 3 may be configured as illustrated in FIG. 10, a schematic cross sectional view of the platform of FIG. 3 from the front along line 10-10. In FIGS. 3 and 4, the platform is divided into a left portion 110A and a right portion 110B. The right portion of the platform 110B includes a position where flavoring may be dispensed into a blender cup 130, and the left portion includes a position where ice may be dispensed into the blender cup and a blender drive motor located in cavity 220 may impart motion to blades in the blender cup to mix a drink. The right portion of the platform 110B may include a perforated upper surface 410 and a drain 420 which may provide for liquid spilled on this portion of the platform to drain away into a main blender drain (not shown). A load cell 330 may be present beneath the platform on either of the platform portions 110A or 110B. A load cell 330 is illustrated in FIG. 10 only under the right portion of the platform 110B, however it should be understood that a load cell may alternatively, or additionally be present beneath the left portion of the platform 110A. In different embodiments, the positions of platform portions 110A and 110B may be reversed.

Figure 11:
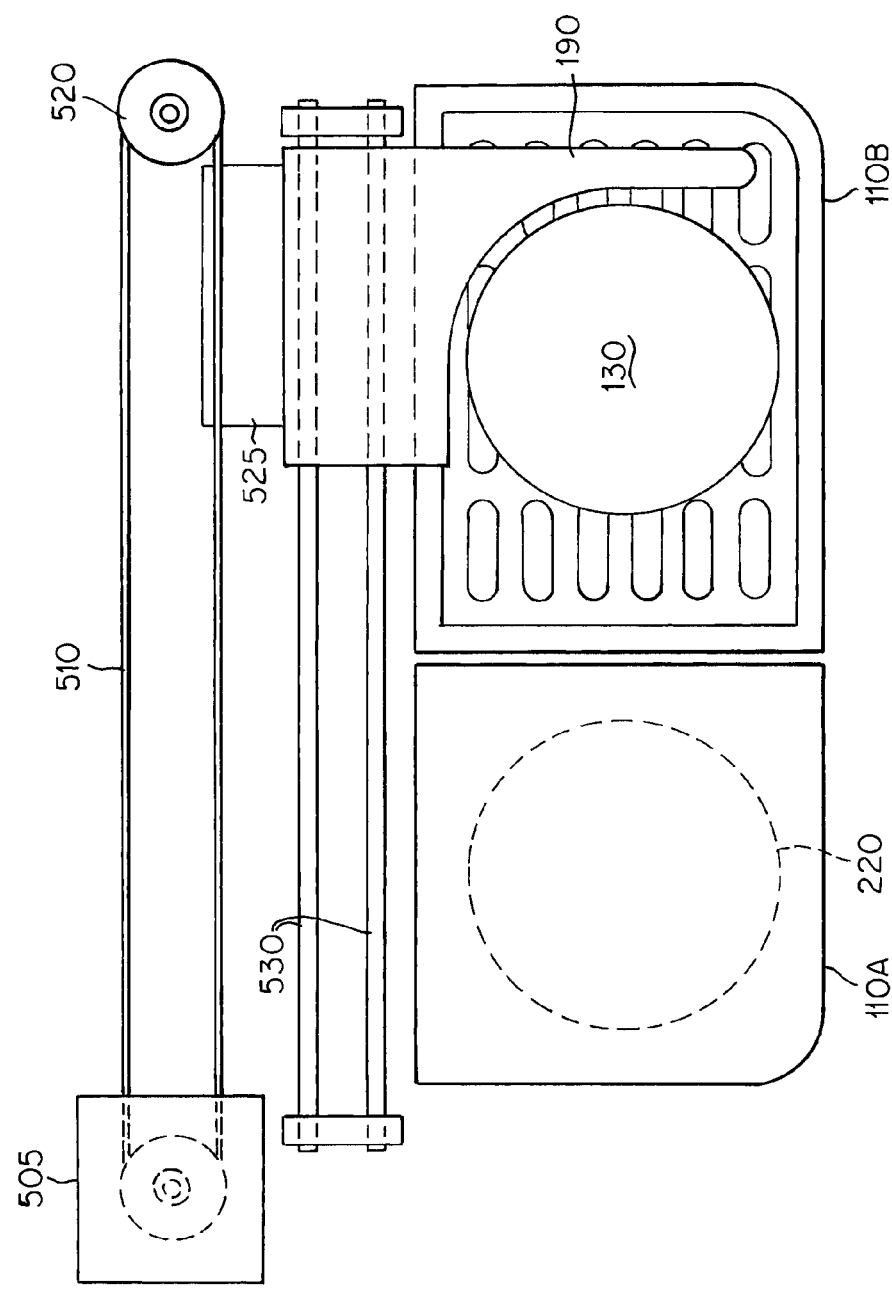
FIG. 11 is a schematic plan view of a blender cup moving apparatus as seen along line 11-11 of FIG. 10 in accordance with one embodiment of the present invention.

Various mechanisms for moving a blender cup 130 across the platform 110 of the blenders of FIGS. 3 and 4 are illustrated in FIGS. 11-15. For example, as illustrated in FIG. 11, an electrical drive motor 505 may drive a belt 510 around a pulley 520. The belt may be coupled to the arm 190 by a belt clamp 525. The arm may be mounted on guide rails 530. Bearings may be present within the body of the arm 190 to provide for low friction movement along the guide rails 530. As the motor moves the belt, for example in a direction clockwise around the pulley 520, the belt clamp transfers this motion to the arm 190 which moves the blender cup from right to left. In some embodiments of this mechanism, the blender may be configured to move the blender cup 130 in a rightward direction rather than a leftward direction, and in some embodiments the arm may be configured to move the blender cup in both a leftward and a rightward direction.

Figure 12:
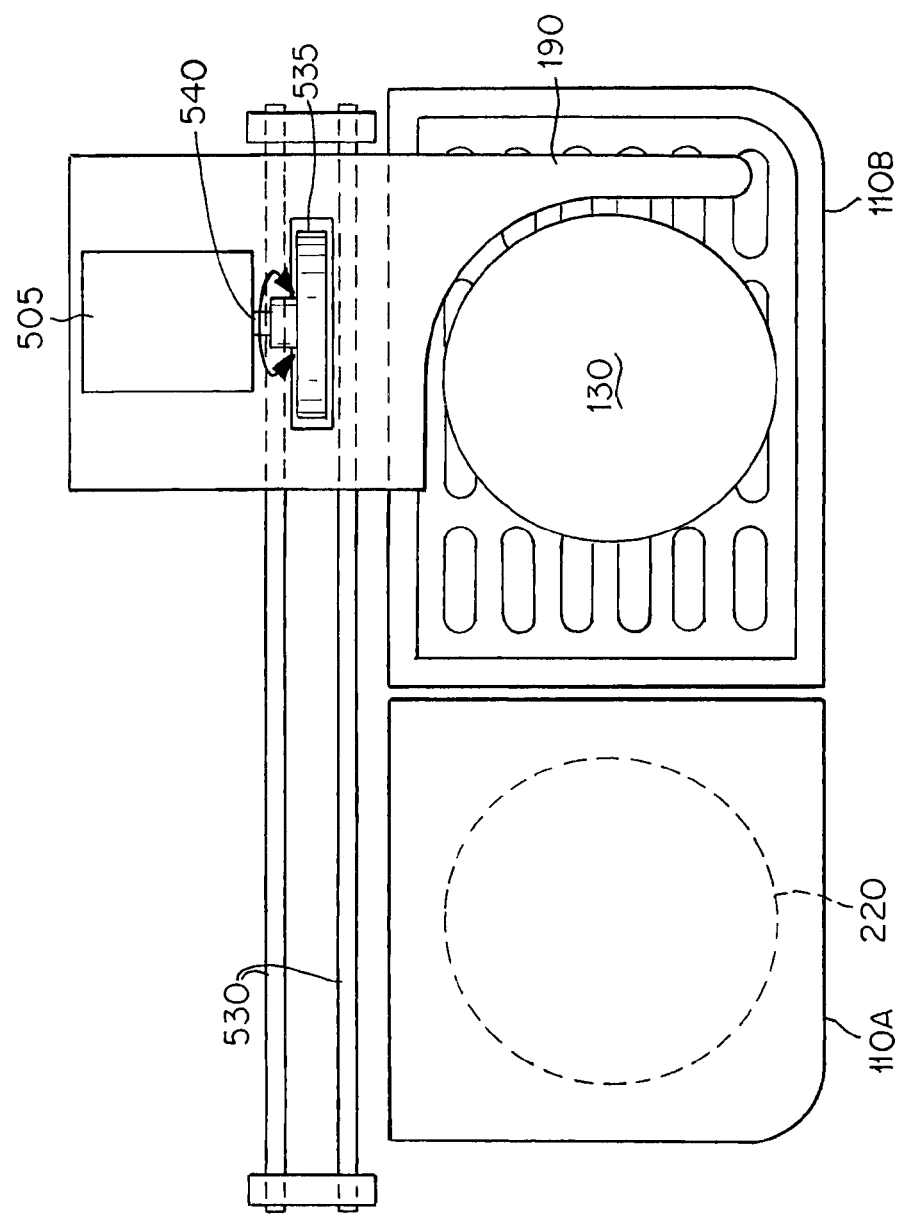
FIG. 12 is a schematic plan view of a blender cup moving apparatus of a blender in accordance with another embodiment of the present invention.

In the embodiment illustrated in FIG. 12, a drive motor 505 may be coupled to a drive wheel 535 by a drive shaft 540. The drive wheel may engage a surface of the blender, or in some embodiments one of the guide rails 530 to move the arm 190, and in turn, the blender cup 130 across the platform 110.

Figure 13:
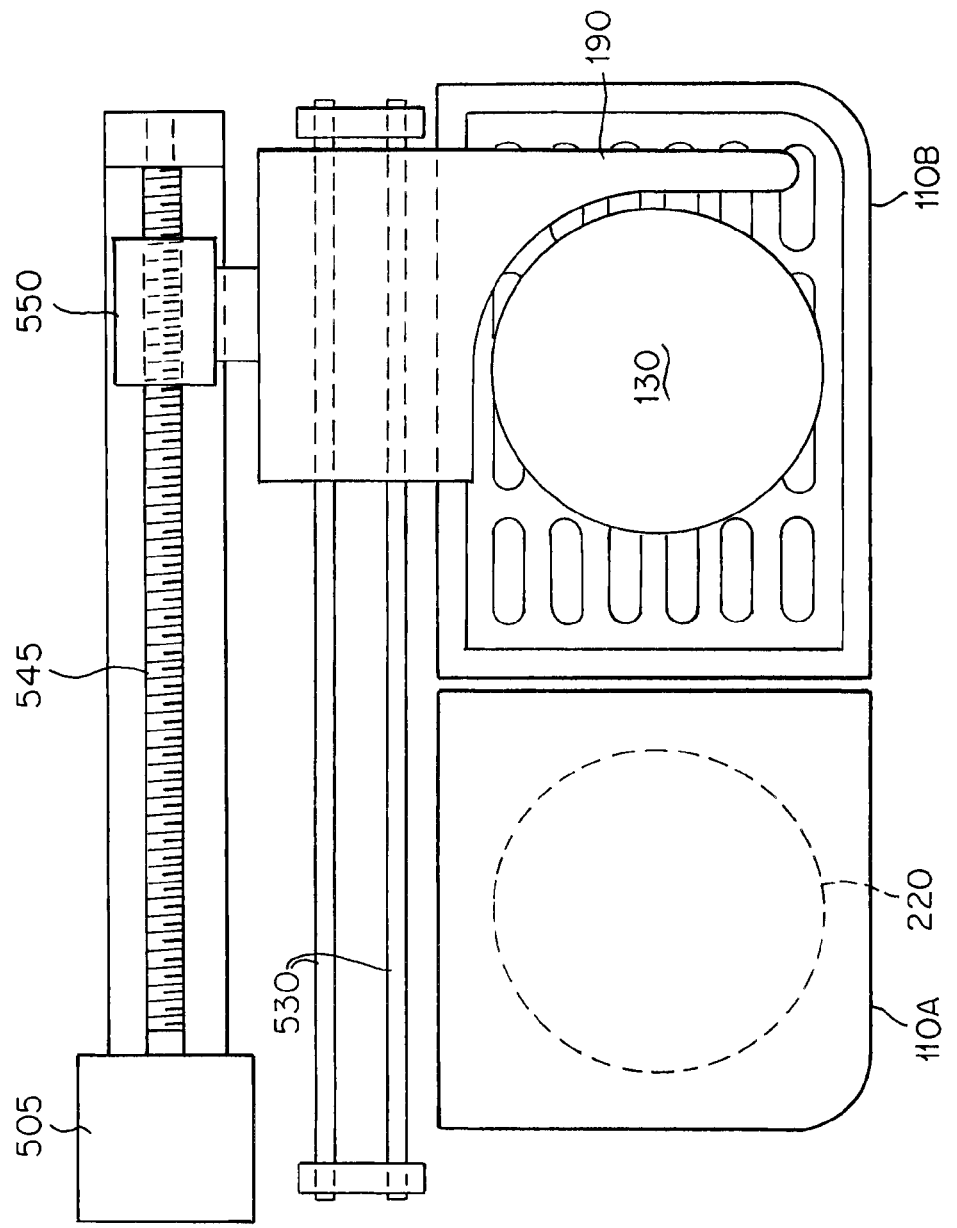
FIG. 13 is a schematic plan view of a blender cup moving apparatus of a blender in accordance with another embodiment of the present invention.
Figure 14:
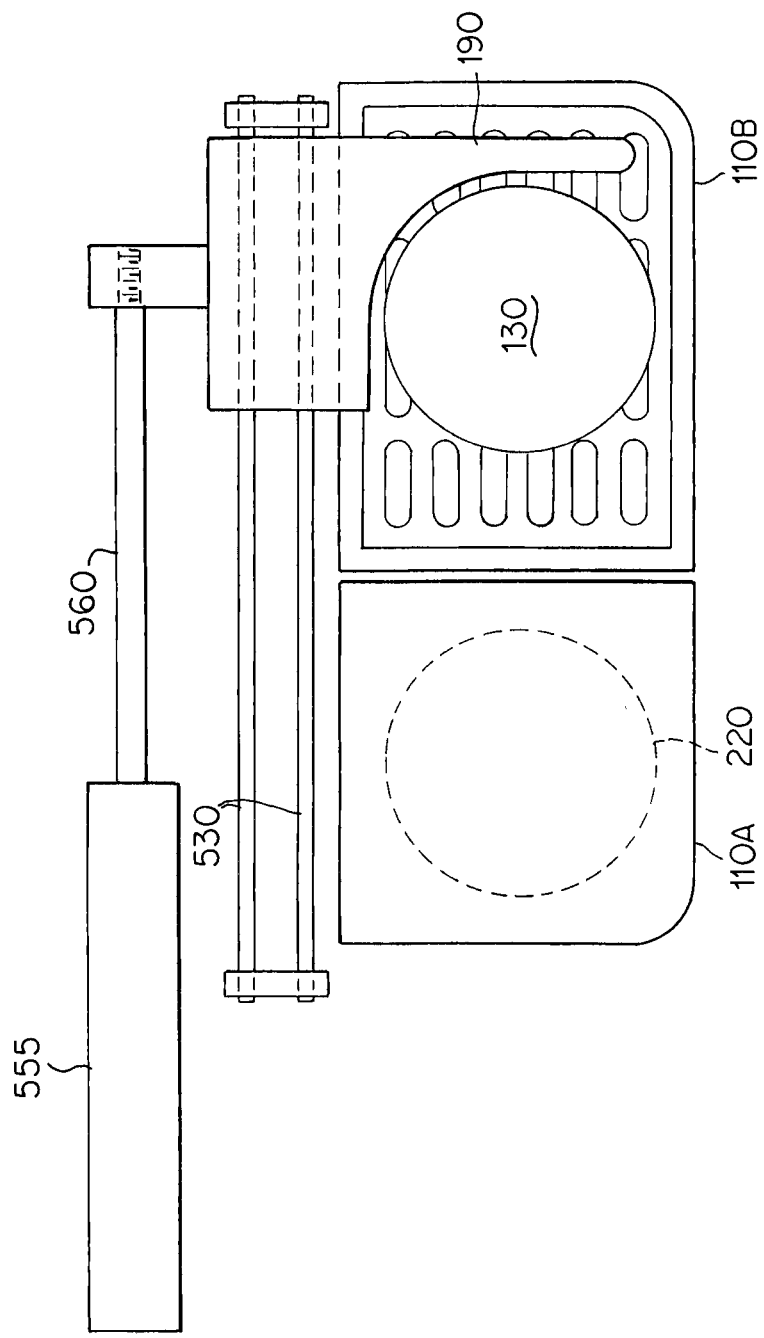
FIG. 14 is a schematic plan view of a blender cup moving apparatus of a blender in accordance with another embodiment of the present invention.
Figure 15:
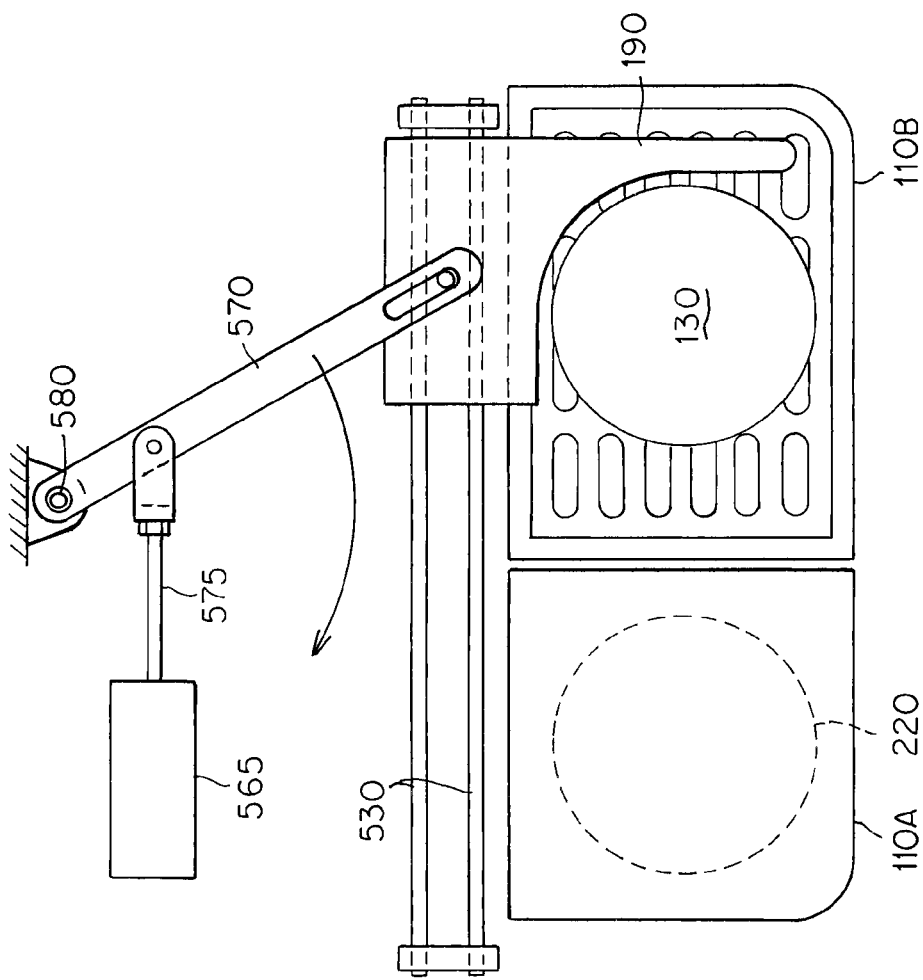
FIG. 15 is a schematic plan view of a blender cup moving apparatus of a blender in accordance with another embodiment of the present invention.

In the embodiment of FIG. 13, an electrically driven screw 545 interfaces with a follower 550 mechanically coupled to the arm 190 to move the arm 190 and the blender cup 130 across the platform 110. In the embodiment of FIG. 14 an electric drive linear actuator 555 pushes and pulls a shaft 560 which is mechanically coupled to the arm 190 to move the arm 190 and the blender cup 130 across the platform 110. In the embodiment of FIG. 15, a driver 565, which may be, for example, a solenoid or an electric drive linear actuator, is coupled to a pivot linkage 570 by a shaft 575. The driver 565 rotates the pivot linkage about a pivot point 580. The pivot linkage is coupled to the arm 190 by a pin on the arm assembly and a slot in the pivot linkage. Movement of the pivot linkage 570 by the driver 565 results in the arm 190 and the blender cup 130 moving across the platform 110.

Any of the mechanisms of FIGS. 11-15 can also be employed to move the platform of the earlier-described embodiments.

In the disclosure below any references to features or operations involving moving the blender cup by moving the platform should also be understood to apply to embodiments wherein the blender cup is moved across a stationary platform by an arm such as that illustrated in FIGS. 3 and 4 and/or as described above.

The blender 100 is provided with circuitry coupled to the weight sensor and configured to take a reading from the weight sensor. This circuitry may include circuitry configured for calibrating the weight sensor and circuitry configured for outputting a signal indicative of a weight measurement from the weight sensor. The circuitry may also include a timer circuit, which may in some embodiments be used to time the dispensing of flavoring product and/or ice.

Figure 16:
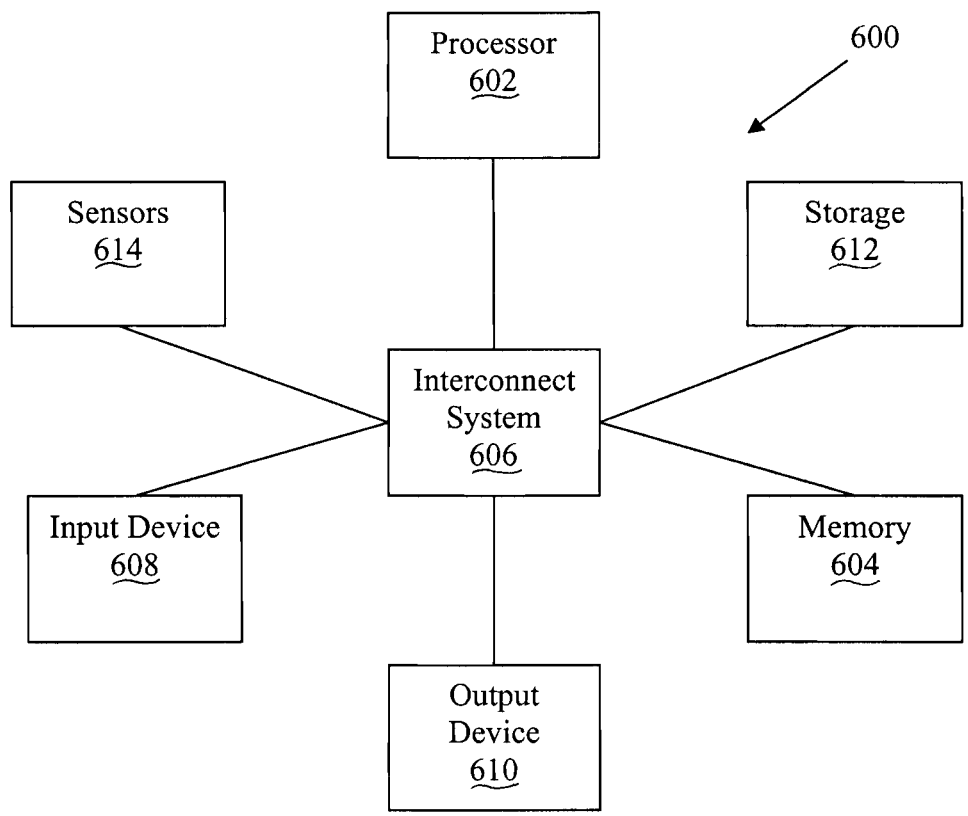
FIG. 16 is a block diagram of a control system for use in embodiments of the present invention.

In one example, a computerized controller for embodiments of the blender system disclosed herein is implemented using one or more computer systems 600 as exemplarily shown in FIG. 16. The computer system 600 may be wholly or partially located within the body of the blender 100, or in other embodiments may be located entirely external to the blender 100. In some embodiments, the computer system 600 may enable a user to remotely control operation of the blender and/or create or modify drink recipes utilized by the blender.

Computer system 600 may be, for example, a general-purpose computer such as one based on an Intel® PENTIUM® or CORE™ processor, a Motorola® POWERPC® processor, a Sun ULTRASPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended specifically for food processing equipment.

Computer system 600 can include one or more processors 602 typically connected to one or more memory devices 604, which can comprise, for example, any one or more of a disk drive memory, a flash memory device, a RAM memory device, or other device for storing data. The one or more processors 602 may include circuitry configured for outputting a signal indicative of a weight measurement from the weight sensor, circuitry configured to calibrate the weight sensor, and a timer circuit. Memory 604 is typically used for storing programs and data during operation of the controller and/or computer system 600. For example, memory 604 may be used for storing historical data relating to measured parameters from any of various sensors over a period of time, as well as current sensor measurement data. Software, including programming code that implements embodiments of the invention, can be stored on a computer readable and/or writeable nonvolatile recording medium such as storage 612 which may comprise, for example, a hard drive or a flash memory, and then copied into memory 604 wherein it can then be executed by processor 602. Such programming code may be written in any of a plurality of programming languages, for example, JAVA® programming language, VISUAL BASIC® programming language, C, C#, or C++, Fortran, Pascal, EIFFEL® programming language, Basic, COBOL, or any of a variety of combinations thereof.

Components of computer system 600 may be coupled by an interconnection system 606, which may include one or more busses (e.g., between components that are integrated within a same device) and/or a network (e.g., between components that reside on separate discrete devices). The interconnection mechanism typically enables communications (for example, data and/or instructions) to be exchanged between components of system 600.

The computer system 600 can also include one or more input devices 608, for example, control buttons, a keyboard, mouse, trackball, microphone, and/or touch screen, and one or more output devices 610, for example, indicator lights, a display screen, and/or a speaker. The computer system 600 may be linked, electronically or otherwise, to one or more sensors 614, which may comprise, for example, a weight sensor or sensors to detect levels of ice in the ice hopper 165 or quantities of undispensed flavoring product. The sensors 614 may also include safety interlocks, for example a force monitor configured to detect a resistance to movement of the platform (or movement arm), a sensor configured to detect whether the lid of the blender is open or closed, or other sensors associated with safety systems described in more detail below which may be included in various embodiments of the blender. In addition, the computer system 600 may contain one or more interfaces (not shown) that can connect computer system 600 to a communication network (in addition or as an alternative to the network that may be formed by one or more of the components of system 600). This communications network, in some embodiments, forms a portion of a process control system for the blender.

According to one or more embodiments, the one or more output devices 610 are coupled to another computer system or component so as to communicate with the computer system 600 over a communication network. Such a configuration permits one sensor to be located at a significant distance from another sensor and allows any sensor to be located at a significant distance from any subsystem and/or the controller, while still providing data therebetween.

Although the computer system 600 is shown by way of example as one type of computer system upon which various aspects of the invention may be practiced, it should be appreciated that the various embodiments of the invention are not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the control system may be implemented in software, hardware, or firmware, or any combination thereof. For example, one or more segments of an algorithm executable on the computer system 600 can be performed in separate computers, which in turn, can be in communication through one or more networks.

Different embodiments of the invention may differ in various ways from the embodiments of the blender illustrated in FIGS. 1-4. In some embodiments, the platform 110, or an arm configured to move the blender cup, is configured to move the blender cup not only to a first position beneath a first product dispenser 150 and a second position beneath a second product dispenser 160, but also to a third position. In some embodiments, this third position is a position wherein blender cup and/or the platform 110 is extended outward from the body of the blender beyond the first position beneath a first product dispenser 150, or located between a position beneath an ice dispenser and a flavoring dispenser. In this position, the blender cup may be more easily accessed by a user so that the user may manually introduce items, such as pieces of fruit or flavoring product into the blender cup.

In some embodiments, the blender cup may be fitted with a lid. The blender cup lid may comprise one or more openings through which solid ingredients, liquid flavorings, or ice may be added into the blender cup. The blender lid may also, in some embodiments, include one or more moveable portions which may be lifted by a user to facilitate access to the interior of the blender cup to, for example, manually add ingredients to the blender cup. In other embodiments, the blender cup lid may comprise a pouring accessory, such as that described in U.S. Pat. No. 7,766,185, issued Aug. 3, 2010, which is hereby incorporated by reference in its entirety. The pouring accessory may facilitate reduction in backsplash of ingredients from the blender cup when ingredients are added and/or blended, and/or may facilitate reduction in spilling of a blended frozen drink as it is poured from the blender cup. In some embodiments blender cups used with embodiments of the blender described herein do not include a lid.

In some embodiments, a moveable lid may be fixed to the blender, and may cover the blender cup when the blender cup is located in one of the positions on the platform. For example, a lid such as lid 195 illustrated in FIG. 1 may be lowered onto a top of a blender cup before a blending operation is initiated. This may facilitate a reduction in splashing of ingredients from the blender cup during blending. The moveable lid 195 may be lowered vertically onto the top of the blender cup from above, or may be hingedly attached to the blender and swung into place, either manually or automatically, on the blender cup when desired. A ring of material (not shown) may be present and fixed to the blender beneath the moveable lid 195. This ring of material is exposed when the moveable lid 195 is lifted. The ring of material may be formed from metal, plastic, or any other material of adequate mechanical strength. This ring of material forms a guard which blocks a user from resting a container of material from which a product is being manually dispensed on the rim of the blender cup. This helps keep the blender cup from being overturned as material is being manually added, and also helps prevent interference with any weight measurement which is performed during the manual addition of material to the blender cup. The guard may be formed in the shape of a ring, or any other shape as desired.

In some embodiments, the platform 110 is not configured to move forward and backward into and out of the body of the blender 100 as is illustrated in FIG. 1. Rather, the platform 110 may be configured to move side to side parallel to a front face of the blender 100. In these alternate embodiments, the first and second product dispensers 150, 160 may also be positioned in a side to side relationship, rather than in forward and backward relationship as is illustrated in FIG. 1. Further, a third platform position which may be utilized for the manual introduction of items into the blender cup may be positioned between the first and second product dispensers 150, 160 or in other embodiments to the side of one or both of the first and second product dispensers 150, 160. In even further embodiments, the first position beneath the first product dispenser 150 and the second position beneath the second product dispenser 160 are vertically displaced from one another.

In some embodiments, the shape, size, and configuration of the platform may be varied from that illustrated in FIG. 1. For example, in some embodiments, protrusions 140 may not be present. In some embodiments, the blender cup 130 may rest in a recess in the upper surface of the platform 110. Embodiments of the present invention are not limited to any particular method or structure for holding or securing a blender cup 130 on the platform 110. Further, the platform may move the blender cup between positions in a different manner than described above. For example, a conveyor belt may be provided on the platform 110 to move the blender cup 130 between positions. In other embodiments, the platform may horizontally rotate about a vertical axis rather than move linearly to move the blender cup from one position to another.

The display screen 185 may be a touch sensitive screen as described above, which a user may utilize to enter commands for the blender, and which may display various indicators to the user. In other embodiments, physical buttons are provided on the blender which the user may press to enter commands for the blender. One or more indicator lights may also be present on the blender to provide indications of various conditions.

Figure 17:
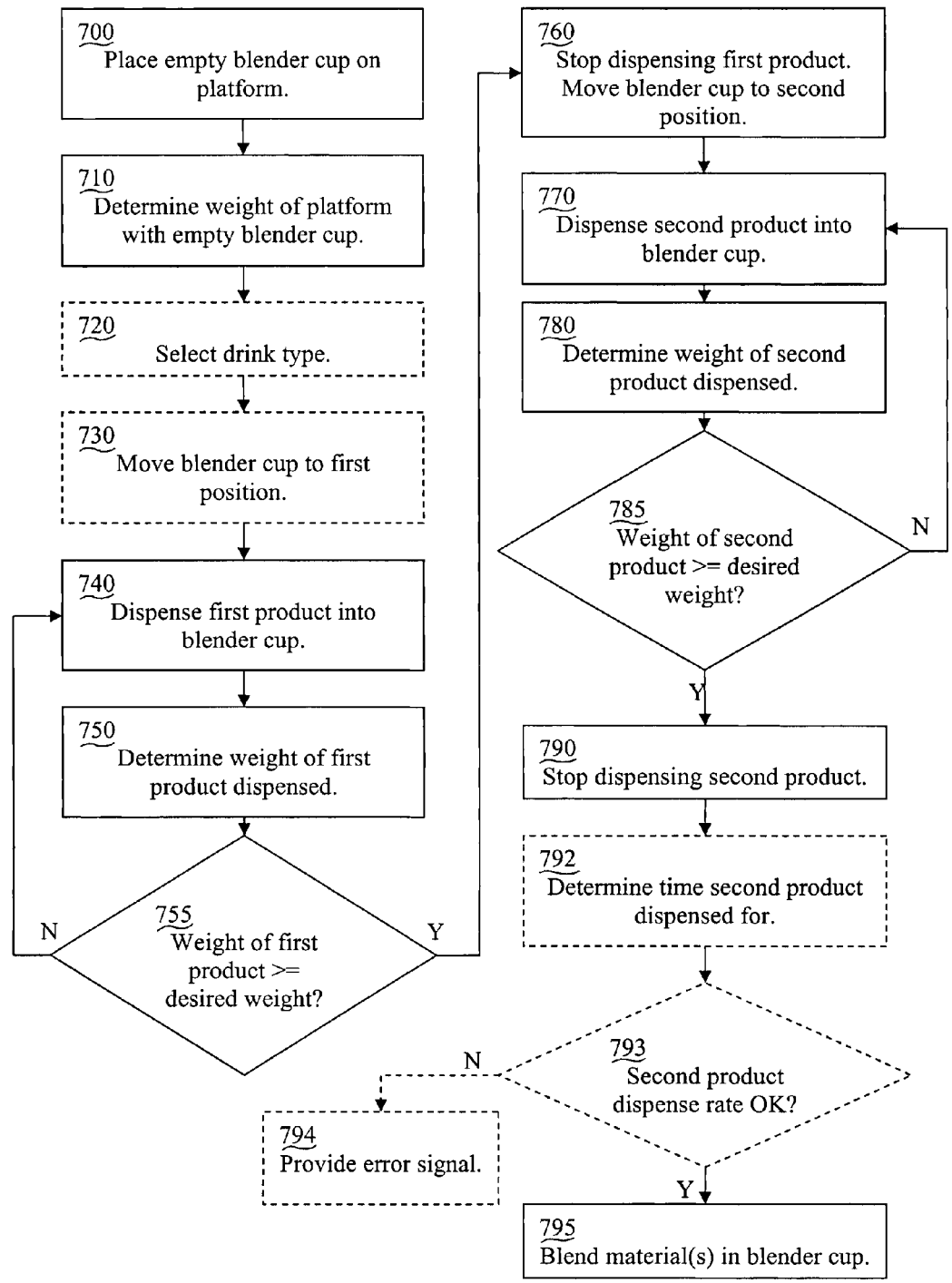
FIG. 17 is a flow chart of a method in accordance with an embodiment of the present invention.

A first method of using a blender according to an embodiment of the present invention is illustrated in the flow chart of FIG. 17. At act 700, a user places an empty blender cup 130 on the platform 110 of the blender. The blender than takes a reading from the weight sensor to determine a weight of the platform holding the empty blender cup (act 710). The weight measurement of the platform holding the empty blender cup may be initiated automatically by the blender upon placement of a blender cup 130 on the platform 110 or may be initiated by the user pressing a control on the blender to read a tare weight of the empty blender cup. The measured weight may be used to zero out the weight measurement circuitry of the blender, or in other embodiments may be stored in a memory of the blender controller for later use. Subtracting the empty weight of the blender cup from a gross weight measurement observed or zeroing the weight while the platform holds the empty blender cup is referred to as taring.

In some embodiments, a measured weight of the platform holding the empty blender cup may be determined by the blender by taking several readings from the weight sensor and averaging the readings together. In other embodiments, the blender make take a series of weight readings and choose a final reading as the correct reading after a specified number of subsequent readings are within a specified range of each other. These or other measurement smoothing techniques may be used to reduce the error rate in the measurement of the weight of the platform holding the empty blender cup, or in the measurement of the weight of any or all ingredients or products added to the blender cup.

At act 720, the user selects a drink type for the blender to make. This selection may be made by, for example, pressing a control indicator on the touch screen 185. In embodiments where the blender is only configured for a single drink type, or wherein the blender will default to a particular drink type if none is selected, act 720 may be omitted, or replaced by an act of the user pressing a "go" or "start" control. In some embodiments, act 720 may be performed before the blender cup is placed on the blender platform.

At act 730 the platform 110 moves the blender cup 130 into a first position beneath a first product dispenser. This step may be omitted in embodiments where the blender cup is already in the first position after the empty blender cup 130 is loaded onto the platform 110. A first product, for example, flavoring or ice, is then dispensed at act 740. As the product is being dispensed, the platform holding the blender cup is weighted (act 750) and the weight of the first product that has been dispensed is determined by taking a measurement from the weight sensor. The weight of the first product will be a reading from the weight sensor circuitry of the blender if the weight measurement circuitry was zeroed out during the taring of the scale while the empty blender cup 130 was present on the platform 110. In other embodiments, the weight of the first product is determined from subtracting the measured weight of the platform holding the empty blender cup stored in memory from the measured weight of the blender cup with the first product dispensed into it. In some embodiments, the weight measurement of act 750 may be performed while the dispensing of the first product is momentarily suspended, and in other embodiments, the weight measurement of act 750 may take place as the product is being dispensed.

At act 755, the blender determines whether the weight of the first product dispensed has reached a desired weight called for by a recipe for the drink type selected. If insufficient product has been dispensed, the dispensing of the first product continues. If a desired amount of the first product (or more) has been dispensed, the blender terminates dispensing of the first product. In some embodiments, if more than a desired amount of the first product was dispensed, the blender will alter the amount of any additional products to be dispensed to form the drink being prepared to obtain the same ratio of ingredients as was called for in the recipe for the drink. If one or more other product is to be dispensed at the first position, the blender repeats acts 740-755 for the one or more other products. In some embodiments, multiple products may be dispensed in steps 740-755 simultaneously. After the last product is dispensed to a desired weight at the first position, the blender stops the dispensing of this last product and the platform 110 moves the blender cup to a second position (act 760).

When the blender cup 130 is in place in the second position, a second product, for example, flavoring or ice, is dispensed into the blender cup (act 770). Like in acts 750 and 755, in acts 780 and 785 the second product is dispensed until a desired weight of the second product is present in the blender cup. The weight of the second product dispensed is calculated from subtracting the weight of the blender cup with the first product(s) and second product from the weight of the bender cup with the first product(s) that was calculated in act 750 before the blender was moved to the second position. In alternate embodiments, the weight sensor circuitry of the blender is zeroed out again when the blender cup enters the second position, and the weight of the second product dispensed is read directly from the weight measurement circuitry.

Once it is determined that a desired amount of the second product has been dispensed (act 785) the blender stops the dispensing of the second product (act 790). If additional products are called for to be dispensed with the blender cup in the second position, acts 780-790 are repeated for these additional products.

Once all products have been dispensed, the blender blends the products in the blender cup to form the frozen drink (act 795). In some embodiments, the blending occurs while the blender cup is in the second position. In other embodiments, the blender cup is moved to the first position or to a third position before the blending commences or while the blending is occurring. In other embodiments, the blender starts the blending operation prior to the completion of the dispensing of the first product(s). In further embodiments, the blender starts the blending operation after the dispensing of the first product(s) but before the dispensing of the second product(s), or after the dispensing of the second product(s) has been initiated but prior to the completion of the dispensing of the second product(s).

In some embodiments, optional acts 792-794 are performed. In act 792, a time that a second product was dispensed for to reach the desired dispense weight is determined from, for example, a timer included in the control circuitry of the blender. The dispense rate (grams/second) is determined from the dispensed weight of the second product and the time it took to dispense the second product. In act 793, the dispense rate is then compared to a desired range of dispense rates for the second product, and if the calculated dispense rate falls outside an acceptable range, a warning or error signal is activated (act 794). The dispense rate could vary for various reasons, and the error signal may indicate a need for maintenance of the blender. For example if the dispense rate measured is for a liquid product, and this rate is calculated as below a desired rate, a liquid line of the blender may need to be cleaned, a liquid pump replaced or serviced, or a source of liquid product replaced. If the dispense rate measured is for shaved ice, and this rate is calculated as below a desired rate, the ice shaver blades of the blender may need to be replaced, or the shaver motor speed increased or the motor serviced, or more ice may be needed in the ice hopper, or an accumulation of ice in the hopper may need to be broken up.

Figure 18:
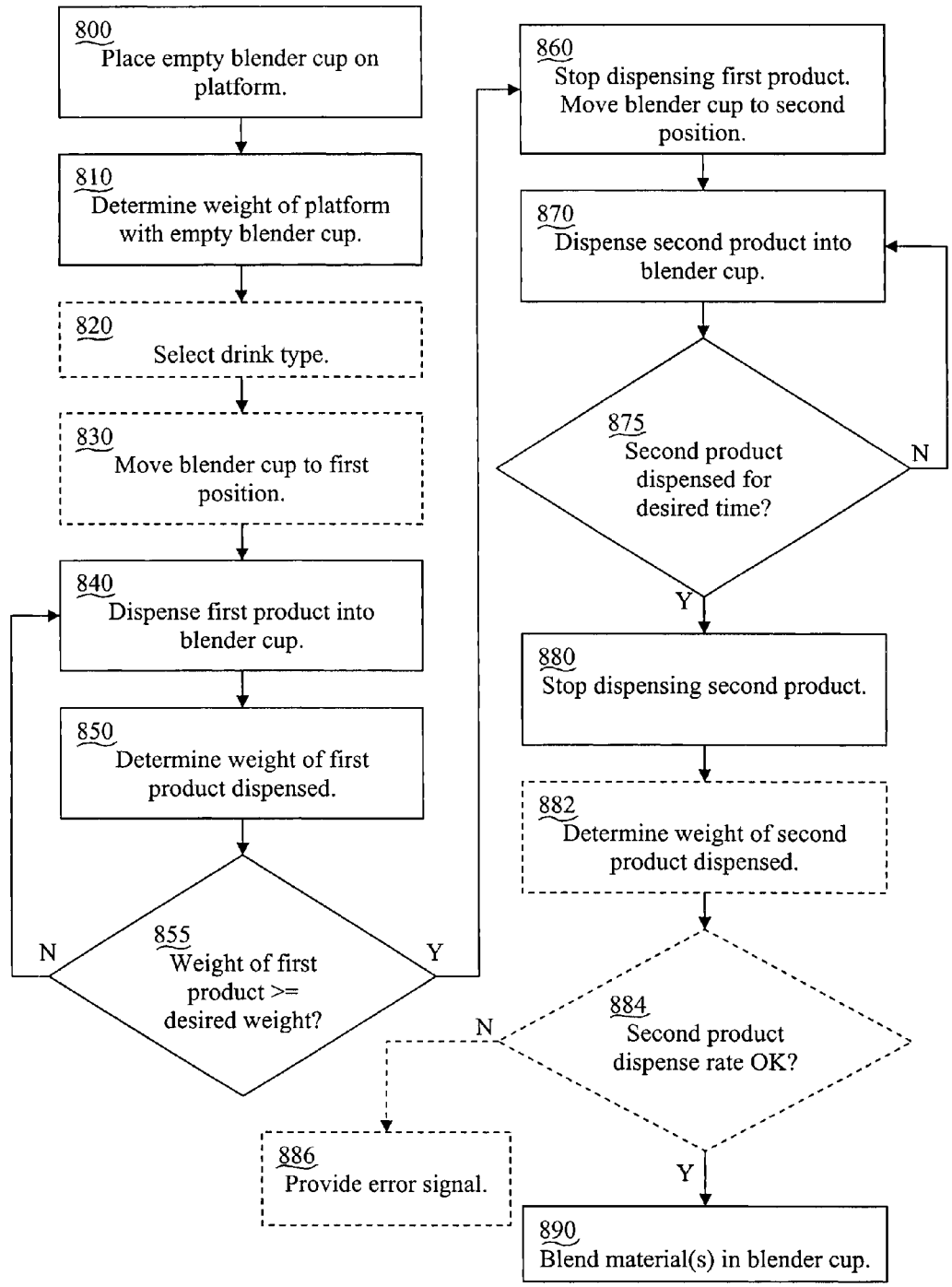
FIG. 18 is a flow chart of another method in accordance with an embodiment of the present invention.

Acts 792-794 are illustrated in FIG. 18 as occurring after the second product was dispensed, but may also, or alternatively, be performed after the first product was dispensed, wherein the dispense rate for the first product is checked. These acts may be performed each time a frozen drink is prepared, on a time based or drink quantity based schedule such as after a determined amount of time has passed since the last time these acts were performed or after a determined amount of drinks were prepared since the last time these acts were performed. In some embodiments, acts 792-794 are performed as an independent operation and not during the preparation of a drink.

In some embodiments, additional acts may be performed in the process of FIG. 17, and in other embodiments the acts depicted may be performed in different orders or one or more of the depicted acts may be omitted. For example, in some embodiments, one or more ingredients may be manually added to the blender after, or in place of the first or second product. In these embodiments, the blender may move to a third position to facilitate the manual addition of ingredients, or the ingredients may be manually added while the blender is in one of the first or second position. The blender may facilitate the addition of a proper amount of manually added ingredients by measuring the weight of the blender cup as the ingredient(s) are manually added and providing a signal, such as the illumination of a light or an indication on the control screen 185 when the desired amount(s) of manually added ingredient(s) have been added to the blender cup. The manual addition of ingredients to the blender cup may in some embodiments be an act programmed into the process for preparing a particular drink. In other embodiments, the manual addition of ingredients to the blender cup may be initiated by a user by selecting an option on the blender display screen 185 or by pressing a manual override or other button on the blender.

In the method described above, and in those described below, in embodiments of the blender wherein a blender cup may be measured only on a single side or portion of the platform 110 (e.g. as in FIG. 10) the weight measurement acts disclosed should be construed as also involving an act of moving the blender cup to a portion of the platform where the weight may be measured, and then returning the blender cup to a previous position, if desired.

FIG. 18 depicts a flowchart of another method in accordance with the present invention. The method of FIG. 18 is substantially similar to the method of FIG. 17. Acts 800-870, 880, 884, 886, and 890 of FIG. 18 correspond to acts 700-770, 790, 793, 794, and 795, respectively of FIG. 17. In different embodiments, the method of FIG. 18 may include any or all of the variations on the illustrated method of FIG. 17 described above. A difference in the method of FIG. 18 as compared to the method of FIG. 17 is that in the method of FIG. 18, the second product is dispensed on a time basis rather than on a weight basis. Specifically, in act 875 of the method of FIG. 18, the second product is dispensed for a defined time rather than until a desired weight of product has been dispensed as in the method of FIG. 17. In act 882, a weight of the second product that was dispensed is determined from the weight sensor, in a manner similar to act 780 of FIG. 17. The blender controller 600 divides the measured weight of the second product dispensed by the defined time the second product was dispensed for to determine a dispense rate in act 884 and compares this dispense rate to an acceptable range of dispense rates. If the dispense rate is outside an acceptable range, an error signal is provided (act 886). In some embodiments, it is the first product, rather than the second product that is dispensed on a time basis, and in these embodiments, acts 882-886 could be performed for the first product to check the dispense rate of the first product. In some embodiments, both the first and the second product are dispensed on a time basis.

In some embodiments, it may be desirable to determine a time that it takes the blender to dispense a defined amount of product so that a drink including a proper proportion of ingredients may be prepared where at least one of the ingredients is dispensed on a time basis. The time that it takes the blender to dispense a defined amount of product, or a dispense rate may be determined according to a calibration process as is illustrated in FIG. 19.

Figure 19:
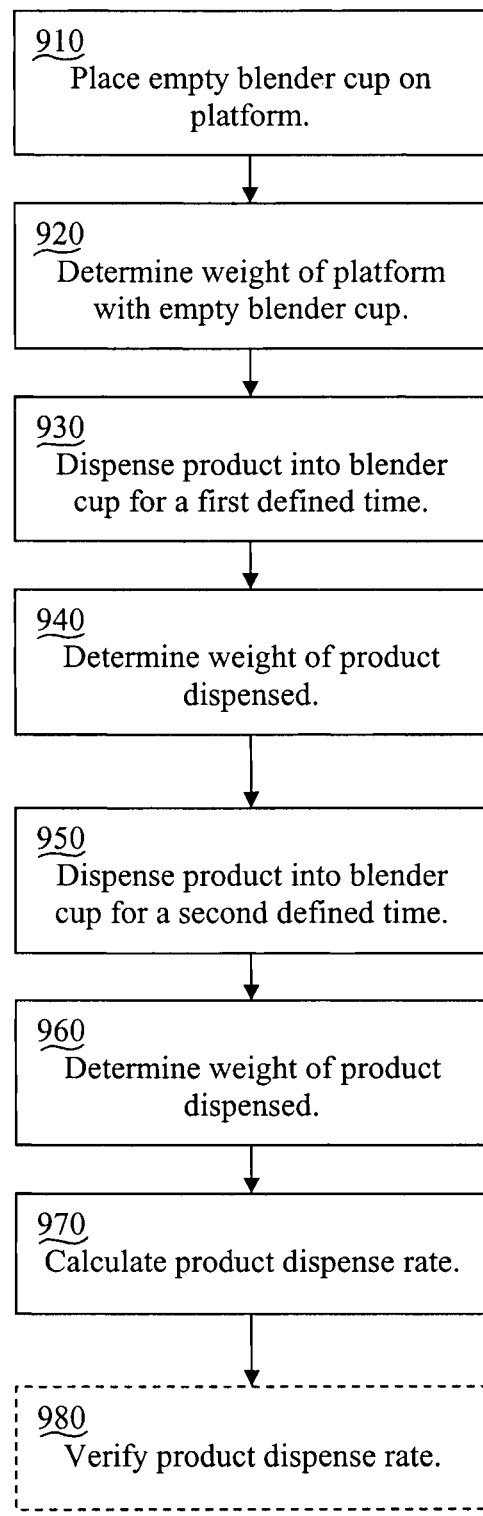
FIG. 19 is a flow chart of another method in accordance with an embodiment of the present invention.

In a first act 910 of the calibration process of FIG. 19, a user places an empty blender cup 130 on the platform 110 of the blender 100. In act 920, the weight of the platform holding the empty blender cup (the tare weight) is determined. This tare weight is used as a zero point against which a weight of the platform holding the blender cup including a dispensed product is compared to determine the weight of the dispensed product. Thus, in some embodiments, the blender cup that is placed on the platform need not be completely empty, and in some embodiments, a receptacle other than an empty blender cup may be used to receive dispensed product in the calibration process.

In some embodiments, the user indicates to the blender that a calibration routine is to be performed and which product is to have its dispense rate calculated. This may be done by interfacing with controls on the touch screen 185 of the blender or by utilizing other controls. The user may perform this indication either before placing the blender cup on the blender platform or after. The determination of the weight of the platform holding the empty blender cup in act 920 may be performed automatically by the blender if the user had indicated to the blender prior to the loading of the blender cup that a calibration routine was to be performed. In other embodiments, the user manually initiates a determination of the weight of the platform holding the empty blender cup by actuating a control of the blender, and then manually initiates the calibration routine by actuating another control.

In act 930 a product is dispensed into the blender cup for a first defined time. The product may include, for example, a flavoring product or ice. The time the product is dispensed for may be set as a time that a user approximates may dispense an amount of the product that is used in a typical drink recipe for a drink prepared on the blender. In act 940 the weight of the product that was dispensed in act 930 is measured by the blender's weight measurement circuitry by measuring the weight of the platform and blender cup and subtracting the tare weight. The weight of the product that was dispensed in act 930 is then stored in the blender's memory.

In act 950 the product is dispensed into the blender cup for a second defined time. The second defined time may in different embodiments be less than, equal to, or greater than the first defined time. In act 960 the weight of the product that was dispensed in act 950 is measured by the blender's weight measurement circuitry by measuring the weight of the platform and blender cup and subtracting the weight determined in act 940. This second weight is also stored in the blender's memory. After the termination of the dispensing of the product, the user may remove the blender cup from the blender.

In act 970, calibration circuitry of the blender adds together the weight of product dispensed in acts 930 and 950 and divides this total weight by the sum of the first defined time and the second defined time to calculate a product dispense rate. In some embodiments, the product dispense rate is verified (act 980) by dispensing the product into a blender cup or other receptacle for a third defined time, which in some embodiments may be equal to or different than either the first or the second defined times, measuring the weight of the product dispensed and checking that weight of the product dispensed, and hence the dispense rate, is within an acceptable tolerance band about the dispense rate calculated in act 970. In some embodiments the dispense rate is verified in act 980 by dispensing a defined weight of product into a blender cup or other receptacle and comparing the time it takes to dispense the defined weight of product to an expected time based upon the dispense rate calculated in act 970, and verifying that the time it takes to dispense the defined weight of product is within an acceptable tolerance band about the expected time. If the dispense rate is within an acceptable range, the blender may provide an indication, for example an illumination of a green light or a message on the display 185. If the dispense rate is not within an acceptable range, the blender may provide a different indication, for example an illumination of a red light or a different message on the display 185.

In some embodiments, the product dispense rate is determined from only a single dispensing of the product.

In some embodiments, a product dispense rate may vary with the amount of time for which a product is dispensed. This may be due to a product dispense pump or an ice shaver motor taking time to come up to speed. Thus, in some embodiments it may be desirable to calculate a dispense time to dispense weight calibration curve rather than or in addition to a simple dispense rate. To do this, the product is dispensed for different times and a dispense rate is calculated for each of the dispense times. For example, a step could be added to the process of FIG. 19 after step 940 to calculate a first dispense rate based only on the amount of product dispensed for the first defined time. This first dispense rate could be combined with the dispense rate calculated in act 970, and/or dispense rates calculated for one or more additional dispense times to build the calibration curve.

Figure 20:
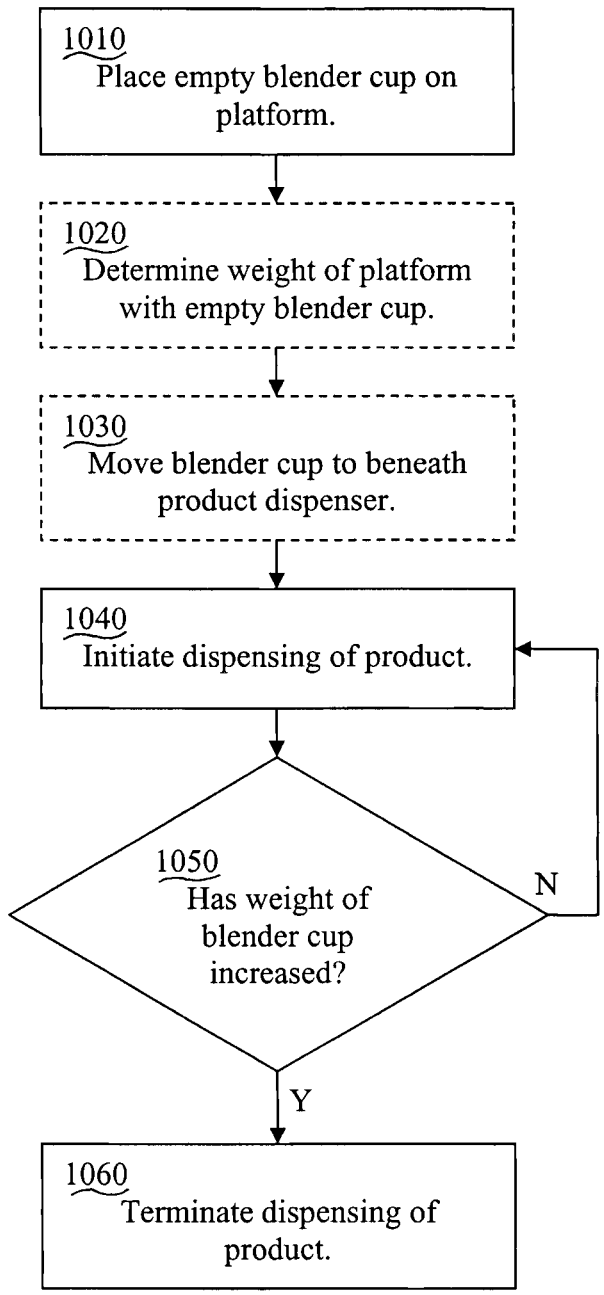
FIG. 20 is a flow chart of another method in accordance with an embodiment of the present invention.

In some embodiments, dispensing a product by time may not result in a desired amount of product being dispensed unless the product dispensing apparatus is primed. It may be desirable to prime the product dispensing apparatus after, for example, attaching a new source of product to the blender, or after the blender was not used for a period of time. A process for priming a dispense apparatus of the blender is illustrated in FIG. 20.

In act 1010 a user places an empty blender cup onto the platform 110 of the blender 100. In act 1020 the weight of the platform holding the empty blender cup (the tare weight) is determined by the blender weight measurement circuitry and stored in the blender's memory. The tare weight may then be used to zero out a weight measurement for the platform 110 and empty blender cup. In some embodiments a receptacle other than an empty blender cup may be used, and in some embodiments, the weight of the platform and blender cup is not zeroed out in the blender weight measurement circuitry, and as such, act 1020 may be omitted.

In act 1030, if the blender cup is not already positioned beneath the product dispenser to be primed, the platform moves the blender cup under the appropriate product dispenser. If the blender cup is loaded onto the blender platform in act 1010 under the appropriate product dispenser, act 1030 may not be necessary.

In act 1040, the blender initiates dispensing of the product. The dispensing apparatus, for example, a liquid product pump or ice shaving motor, runs until in act 1050 the weight measurement circuitry of the blender determines that the weight of the blender cup has increased. The increase in the weight of the blender cup indicates that the product dispenser has been primed and the product has begun to be dispensed into the blender. In response to the determination that the weight of the blender cup has increased in act 1050, the blender terminates the dispensing of the product in act 1060. In some embodiments, the dispensing of the product continues for a short period of time after the determination that the weight of the blender cup has increased in act 1050 and the termination of the dispensing operation in act 1060. After the termination of the dispensing of the product, the user may remove the blender cup from the blender.

One or more embodiments of the blender may include one or more safety features. For example, the blender may include a safety circuit configured to receive a sensor input and to facilitate safe operation of the apparatus responsive to the sensor input being indicative of a safe operating condition of the blender. One sensor from which the sensor input may be received is the weight sensor. The weight sensor may be utilized to provide a signal to the safety circuit indicative of whether the blender is functioning or being used properly. For example, at various points in the preparation of a frozen drink, a determined weight of product and/or ice may be expected to have been dispensed into the blender cup. The weight sensor may be used to weigh the blender cup at one or more points during the preparation of a frozen drink and provide a signal to the safety circuit indicative of the weight measured. The safety circuit may determine whether the measured weight is within a defined tolerance band about an expected weight corresponding to the one or more points in the preparation of the frozen drink. The tolerance band may be calculated from historical natural variation (e.g. at plus or minus three standard deviations about a historically observed mean or median weight stored in a memory of the blender during previous preparations of the drink) in the observed weight of the blender cup at the point in question in the preparation of the frozen drink. Points in the preparation of a frozen drink where a sensed weight may be compared to an expected weight to ascertain proper operation or usage of the blender may be any one or more of at the initiation of a drink preparation operation, just prior to or just after movement of the platform, just prior to or just after introduction of a first ingredient into the blender cup, just prior to or just after introduction of a second or subsequent ingredient into the blender cup, just prior to or just after a manual ingredient addition operation, just prior to blending of the ingredients in the blender cup, after blending of ingredients in the blender cup, and any other point before or after any of these points.

If the signal provided from the weight sensor to the safety circuit is indicative of a weight outside of the defined tolerance band about the expected weight corresponding to the one or more points in the preparation of the frozen drink, this may be indicative that one or more sub-systems of the blender may be malfunctioning. For example, if the weight is too low, this may be indicative of a blockage in a flavoring dispenser, an electrical malfunction in a pump associated with a flavoring dispenser, an electrical short which has resulted in the ice dispenser failing to dispense ice, a malfunction of the platform such that the blender cup was not positioned properly beneath a flavoring dispenser or the ice dispenser to receive flavoring or ice, that the blender cup may have fallen from the platform, that an improper blender cup may have been loaded onto the blender, that a user of the blender may have inadvertently placed a finger or other body part beneath the blender cup or other portion of the blender, or some other equipment fault or human error may have occurred. If the measured weight is greater than expected, this may be indicative of, for example, the ice dispenser or a flavoring dispenser dispensing ice or flavoring more quickly or in a greater volume than expected, an improper blender cup having been loaded onto the blender, the blender cup having been overfilled due to some other cause, or a user of the blender may have inadvertently placed a finger or other body part on the blender cup, weight sensor, or other portion of the blender.

In some embodiments if a signal indicative of an unexpected weight is delivered from the weight sensor to the safety circuit, one or more of the sub-systems of the blender may be deactivated pending troubleshooting, and an indication of the deactivation may be provided to an operator by for example, an illumination of a light or a message on the display screen 185. The sub-system deactivated may in some embodiments be one which was utilized in the preparation of the frozen drink just prior to the signal indicative of the unexpected weight being sent to the safety circuit.

In some embodiments a weight of the blender cup at least partially filled with ingredients is checked for a proper weight by the weight sensor and the safety circuit just prior to the point in the preparation of the frozen drink when the ingredients are to be blended. An indication of a weight greater than expected may be indicative of an over full blender cup that could overflow when the ingredients contained therein are blended. Thus, in some embodiments, if a weight outside an expected range is sensed just prior to the activation of the blender, the blending function may be disabled and an indication provided to a user that troubleshooting may be required.

In some embodiments, movement of the platform may be disabled if a weight outside of an expected range at a point in the preparation of the frozen drink just prior to the movement of the platform is detected. A warning indicative of a possible problem with one or more sub-systems may be provided to a user when the movement of the platform is disabled.

In some embodiments, any one or more of the above described error indications or warnings may need to be cleared by a user prior to the blender safety circuitry allowing for normal operations of the blender, including for example, re-enabling of any disabled sub-systems, to resume. In other embodiments, if a particular sub-system is disabled, for example, one of the flavoring dispensers or another sub-system, the blender may continue operation, but not be operable to produce frozen drinks which require the use of the disabled flavoring dispenser or other sub-system. In such instances, a warning may be issued if the preparation of a drink requiring the use of the disabled flavoring dispenser or other sub-system is called for on the blender.

In some embodiments, a weight of the blender cup may be checked by the safety circuit prior to the introduction of any ingredients into the blender cup. If the weight sensed is outside of a range consistent with an empty blender cup, or in embodiments where the blender cup includes a lid, of an empty blender cup and lid, this may be indicative of a partially full blender cup or other inappropriate container, or no container at all, having been placed on the platform. In such instances, in some embodiments, the blender will halt the drink preparation operation and not allow the introduction of ingredients into the blender cup until an error message or warning is cleared.

In some embodiments, the blender cup may have a lid which may be moveable between an open position and a closed position. In such embodiments it may be desirable to ensure the lid is closed when the platform is to be moved to ensure the open lid does not catch on a portion of the blender or so that ingredients in the blender cup will not spill out during movement of the blender cup. Thus, in some embodiments a lid sensor is provided, for example attached to or forming part of the body of the blender, which may monitor the open or closed state of the blender cup lid. The lid sensor may be a magnetic sensor, a capacitive sensor, an electric eye, or any other type of sensor capable of detecting a position of a blender cup lid. In some embodiments, the lid sensor may comprise the weight sensor, which may register a change, e.g. a decrease, in weight of a blender cup when the lid is held open. The lid sensor may communicate a signal indicative of the state of the blender cup lid to the safety circuitry of the blender. If the blender cup lid is detected as open, movement of the platform may be disabled until the lid is closed. Similarly, if the blender cup lid is meant to be in a closed position during blending of the drink ingredients in the blender cup, the state of the blender cup lid may be checked prior to initiating blending and the blending function may be disabled while the blender cup lid is in an open position.

In some embodiments, the blender may include an apparatus, for example an electromagnet or a solenoid, which facilitates maintaining the blender cup lid in an open position. It may be desirable to maintain the blender cup lid in an open position at a point in the preparation of a frozen drink where, for example, drink ingredients are to be manually added to the blender cup. In some embodiments, the apparatus for facilitating maintaining the blender cup lid in the open position may only be enabled at a point in a drink preparation operation where manual addition of ingredients is called for. In some embodiments, the blender will only transition to a manual loading mode wherein the apparatus for facilitating maintaining the blender cup lid in the open position is enabled after verification by the safety circuit that the blender cup has a proper weight. The proper weight may be defined by a weight range consistent with the blender cup holding an amount of ingredients expected at a point in a drink preparation operation wherein manual addition of ingredients to the blender cup is to be performed. If the measured weight is inconsistent with an expected weight, the blender may disable the initiation of manual mode. In some embodiments, the apparatus for facilitating maintaining the blender cup lid in the open position is only operable when the blender is in manual mode. Thus, the apparatus for facilitating maintaining the blender cup lid in the open position may in some embodiments only be operable after a check is performed to verify a weight of the blender cup is within a desired range of a defined weight.

In some embodiments, the apparatus for facilitating maintaining the blender cup lid in the open position may exert an upwards force on the blender cup and/or blender cup lid. A measured weight of the blender cup may thus decrease when the lid is held open by the apparatus for facilitating maintaining the blender cup lid in the open position. In some embodiments, an expected weight of a blender cup at a point in a drink preparation operation just prior to, or just after manual addition of ingredients may be adjusted by the amount of weight by which the measured weight is expected to decrease due to the blender cup lid being held open by the apparatus for facilitating maintaining the blender cup lid in the open position.

It may be desirable to disable movement of the platform when an unexpectedly or undesirably high resistance to movement of the platform is manifested. This may help prevent, for example, overheating of a motor for moving the platform, damage to the platform or to the apparatus utilized to move the platform, or injury to a user who may have mistakenly placed a hand or a finger in the path of the moving platform. To detect an undesirably high resistance to movement of the platform, in some embodiments, a force monitor may be provided to measure the resistance to movement of the platform. The force monitor may deliver a signal to the safety circuitry. The safety circuitry may disable movement of the platform upon receipt of a signal consistent with the platform experiencing an unexpectedly or undesirably high resistance to movement.

The force monitor may comprise, for example, a load cell mechanically coupled to the apparatus utilized to move the platform, a current meter configured to measure a current delivered to an electrical motor utilized to move the platform, and/or may comprise the weight sensor. During movement of the platform, the measured weight of a blender cup on the platform may be expected to vary in a predictable way. For example, during smooth movement of the platform, the measured weight of the blender cup on the platform may be expected to vary only within a limited range. Resistance to movement of the platform may result in the platform moving jerkily, which may result in a measured weight of a blender cup on the platform deviating from what would be expected. For example, the measured weight of a blender cup on the platform may vary more over time when the platform is moving in opposition to an undesired or unexpected resistance to movement than would be expected if the platform was operating normally. The movement of the platform may be disabled, and an error signal produced upon a detection by the safety circuit of a signal from the weight sensor indicative of a measured weight of a blender cup varying more over time during movement of the platform than would normally be expected (e.g. as compared to historically observed values recorded by the blender or otherwise programmed into the blender and accounting for normal variation in said historically observed values).

In another embodiment, an angled connection may be provided between the load cell 330 and the platform 110. Upon acceleration of the platform an increase in weight may be measured by the weight sensor. If there is an unexpected resistance to movement of the platform at a point in the preparation of a frozen drink, the change in the weight measurement observed may vary from what would normally be expected at that point in the preparation of a frozen drink. A comparison between observed and expected weight measurements upon acceleration of the platform could thus also be used to detect an unexpected resistance to movement of the platform.

In some embodiments, a micro-electromechanical (MEMS) accelerometer coupled to the platform could be utilized to measure the acceleration of the platform and provide a signal to the blender safety circuitry which could compare the measured acceleration to an expected acceleration to determine if there is an unexpected resistance to movement of the platform.

In some embodiments, the safety circuit may be configured to monitor a time it takes to dispense flavoring from a flavoring dispenser and/or ice from an ice dispenser and compare the amount of time to dispense a defined amount of flavoring or ice into a blender cup as measured by the weight sensor. If the measured amount of time is outside of an expected range (e.g. as defined by a historically observed dispense rate and a natural variation thereof) this may be indicative of an error in the flavoring or ice dispenser. In some embodiments if the safety circuit determines that a time to dispense flavoring or ice is outside a defined range, the safety circuit may disable the flavoring or ice dispenser and/or cause an error message or warning to be displayed and/or halt the preparation of a frozen drink until the warning or error is cleared.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for preparing frozen drinks comprising:
 a platform configured to support a blender cup, the platform reversibly translatable into and out of a body of the apparatus between a first position beneath an ice shaver and a second position beneath a flavoring dispenser;
 a weight sensor mechanically coupled to the platform and configured to produce an output signal indicative of a weight of an object present on the platform; and
 a safety circuit configured to receive a sensor input and to facilitate safe operation of the apparatus responsive to the sensor input being indicative of a safe condition of the apparatus.

2. The apparatus of claim 1, wherein the sensor input comprises the output signal from the weight sensor.

3. The apparatus of claim 2, wherein the safety circuit is configured to compare a measured amount of time to dispense a weight of ice from the ice shaver to a defined time, and responsive to the measured amount of time differing from the defined time by more than a defined amount, disabling operation of the ice shaver.

4. The apparatus of claim 2, wherein the safety circuit is configured to compare a measured amount of time to dispense a desired weight of flavoring from the flavoring dispenser to a defined time, and responsive to the measured amount of time differing from the defined time by more than a defined amount, disabling operation of the flavor dispenser.

5. The apparatus of claim 2, wherein the output signal from the weight sensor is indicative of a weight within a range corresponding with a point in a preparation of a frozen drink on the apparatus.

6. The apparatus of claim 5, wherein the safety circuit is configured to disable activation of the apparatus absent a receipt of the output signal from the weight sensor being indicative of a weight within a range expected at a point in the preparation of the frozen drink immediately prior to the activation of the apparatus.

7. The apparatus of claim 6, wherein the desired range is calculated at least in part from an expected weight of an amount of ingredients expected to be present in the blender cup prior to the activation of the apparatus.

8. The apparatus of claim 5, wherein the safety circuit is configured to disable movement of the platform absent a receipt of the output signal from the weight sensor being indicative of a weight within a range expected immediately prior to a point in the preparation of the frozen drink wherein movement of the platform is to be performed.

9. The apparatus of claim 8, wherein the range includes a weight consistent with that of an empty blender cup and lid prior to a point in the preparation of the frozen drink wherein drink ingredients are added to the blender cup.

10. The apparatus of claim 8, wherein the range includes a weight consistent with that of the blender cup filled with a desired quantity of one of ice and flavoring at point in the preparation of the frozen drink subsequent to the addition of one or more drink ingredients to the blender cup.

11. The apparatus of claim 5, wherein the safety circuit is configured to disable the ice shaver absent a receipt of the output signal from the weight sensor being indicative of a weight within a range expected at a point in the preparation of the frozen drink immediately prior to the activation of the ice shaver.

12. The apparatus of claim 11, wherein the desired range includes a weight consistent with that of an empty blender cup and lid.

13. The apparatus of claim 11, wherein the range includes a weight consistent with that of the blender cup filled with a desired quantity of flavoring.

14. The apparatus of claim 5, wherein the safety circuit is configured to disable the flavoring dispenser absent a receipt of the output signal from the weight sensor being indicative of a weight within a range expected at a point in the preparation of the frozen drink immediately prior to the dispensing of flavoring into the blender cup.

15. The apparatus of claim 14, wherein the desired range includes a weight consistent with that of an empty blender cup and lid.

16. The apparatus of claim 14, wherein the range includes a weight consistent with that of the blender cup filled with a desired quantity of ice.

17. The apparatus of claim 1, wherein the safety circuit is configured to disable a blending function of the apparatus when a lid of the blender cup is in an open position.

18. The apparatus of claim 17, wherein the safety circuit is configured to disable the activation of the manual loading mode absent a receipt of the output signal from the weight sensor being indicative of a weight within a range including a weight consistent with an expected weight of the blender cup and lid while the lid of the blender cup is being held in an open position at a point in the preparation of the frozen drink at which manual addition of ingredients to the blender cup is to be performed.

19. The apparatus of claim 18, wherein the range includes a weight consistent with a weight of the blender cup and lid while the lid of the blender cup is being held in an open position.

20. The apparatus of claim 18, wherein the range includes a weight consistent with a weight of the blender cup and lid while the lid of the blender cup is being held in an open position and the blender cup is filled with a quantity of at least one of ice and flavoring.

21. The apparatus of claim 1, wherein the safety circuit is configured to disable movement of the platform when a lid of the blender cup is in an open position.

22. The apparatus of claim 1, further comprising a force monitor configured to detect a resistance to movement of the platform in electrical communication with the safety circuit.

23. The apparatus of claim 22, wherein the safety circuit is configured to halt movement of the platform responsive to a receipt of a signal from the force monitor indicative of a resistance to movement of the platform.

24. The apparatus of claim 22, wherein the safety circuit is configured to halt movement of the platform responsive to a receipt of the output signal from the weight sensor being indicative of a resistance to movement of the platform.

\* \* \* \* \*